United States Patent [19]
Kreusel

[11] Patent Number: 5,127,758
[45] Date of Patent: Jul. 7, 1992

[54] PIPE JOINT

[76] Inventor: Ulrich Kreusel, Birkenstrasse 28, D-6537 Gensingen, Fed. Rep. of Germany

[21] Appl. No.: 490,692

[22] PCT Filed: Aug. 29, 1988

[86] PCT No.: PCT/DE88/00524
§ 371 Date: May 10, 1990
§ 102(e) Date: May 10, 1990

[87] PCT Pub. No.: WO89/02539
PCT Pub. Date: Mar. 23, 1989

[51] Int. Cl.$^5$ .................................. F16D 1/00
[52] U.S. Cl. .................................. 403/171; 403/176; 403/174
[58] Field of Search ............... 403/169, 170, 171, 172, 403/174, 175, 176, 49

[56] References Cited

U.S. PATENT DOCUMENTS

| | | | |
|---|---|---|---|
| 3,356,394 | 12/1967 | Chamayou | 403/171 |
| 4,273,463 | 6/1981 | Dobersch | 403/49 X |
| 4,669,908 | 6/1987 | Simone et al. | 403/170 |

FOREIGN PATENT DOCUMENTS

| | | |
|---|---|---|
| 0034078 | 8/1981 | European Pat. Off. . |
| 0157993 | 10/1985 | European Pat. Off. . |
| 8703940 | 7/1987 | Fed. Rep. of Germany . |
| 2950742 | 6/1991 | Fed. Rep. of Germany . |
| 8302633 | 8/1983 | Int'l Pat. Institute . |

Primary Examiner—Andrew V. Kundrat
Attorney, Agent, or Firm—Spencer, Frank & Schneider

[57] ABSTRACT

A pipe joint for joining several pipes used in a pipe grid structure such as a scaffold. Each pipe (3) is connected, by way of a connecting member (17) inserted into its interior from the end of the pipe and by way of a clamping device (16) composed of two opposing clamping jaws (21, 22) held together by a screw connection (20), with the continuous or discontinuous peripheral extension (9) of a connecting element (1).

25 Claims, 20 Drawing Sheets

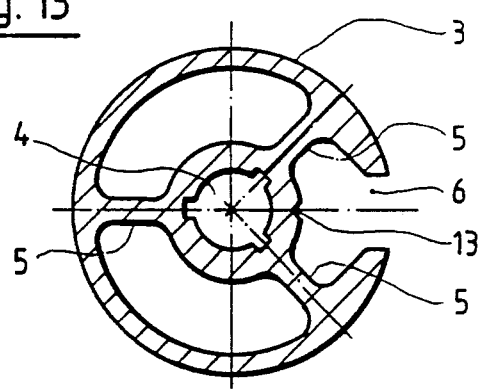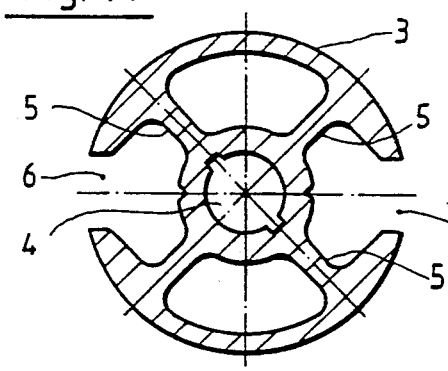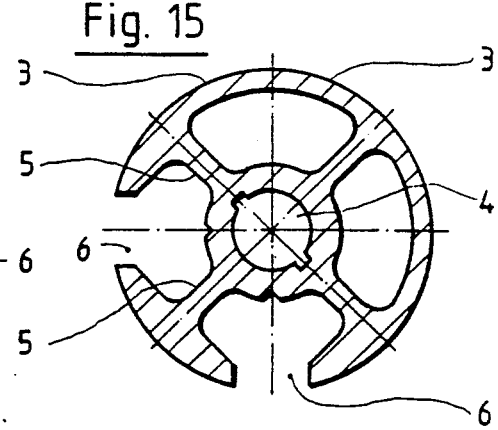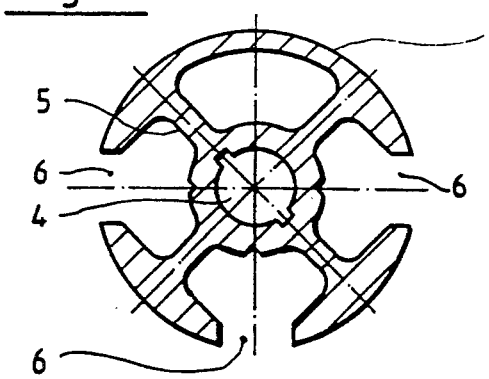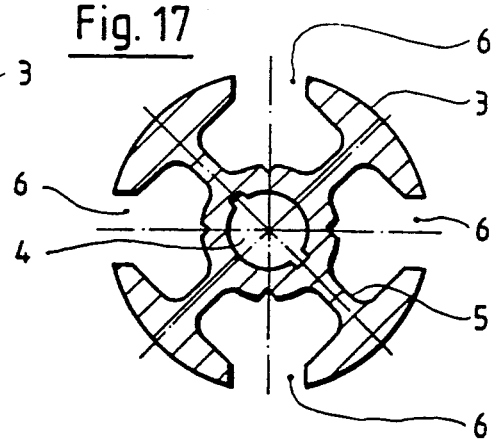

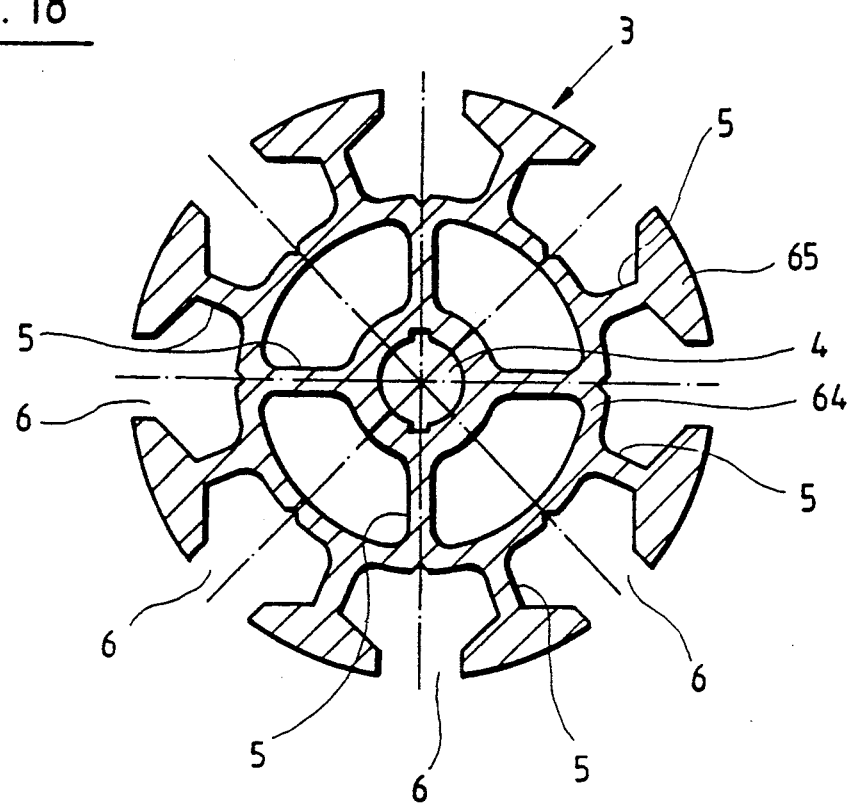

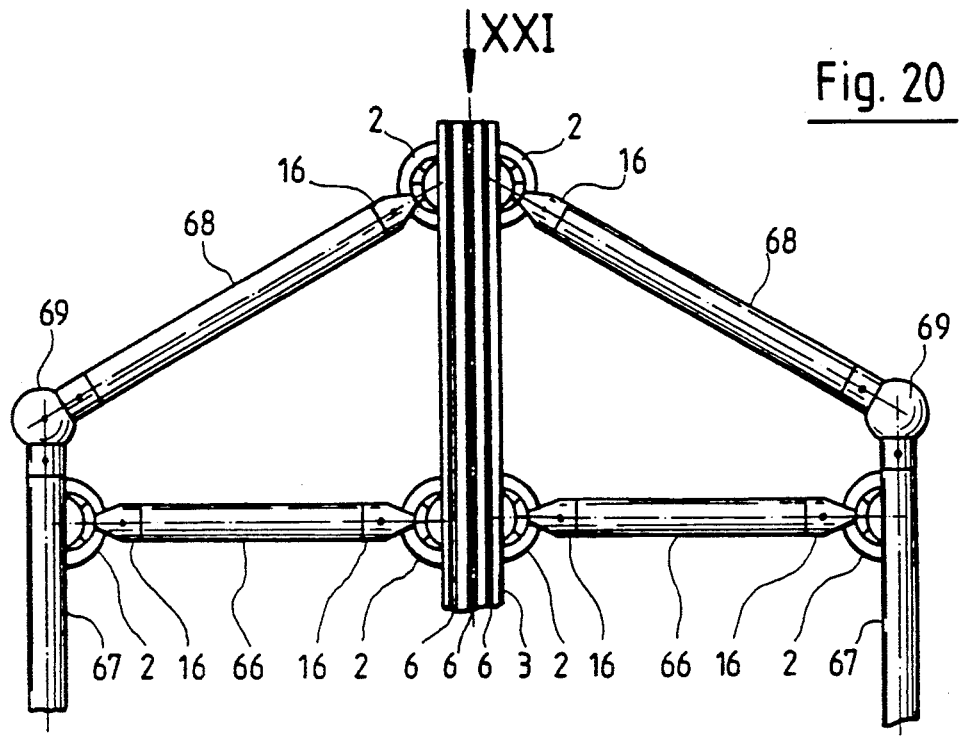
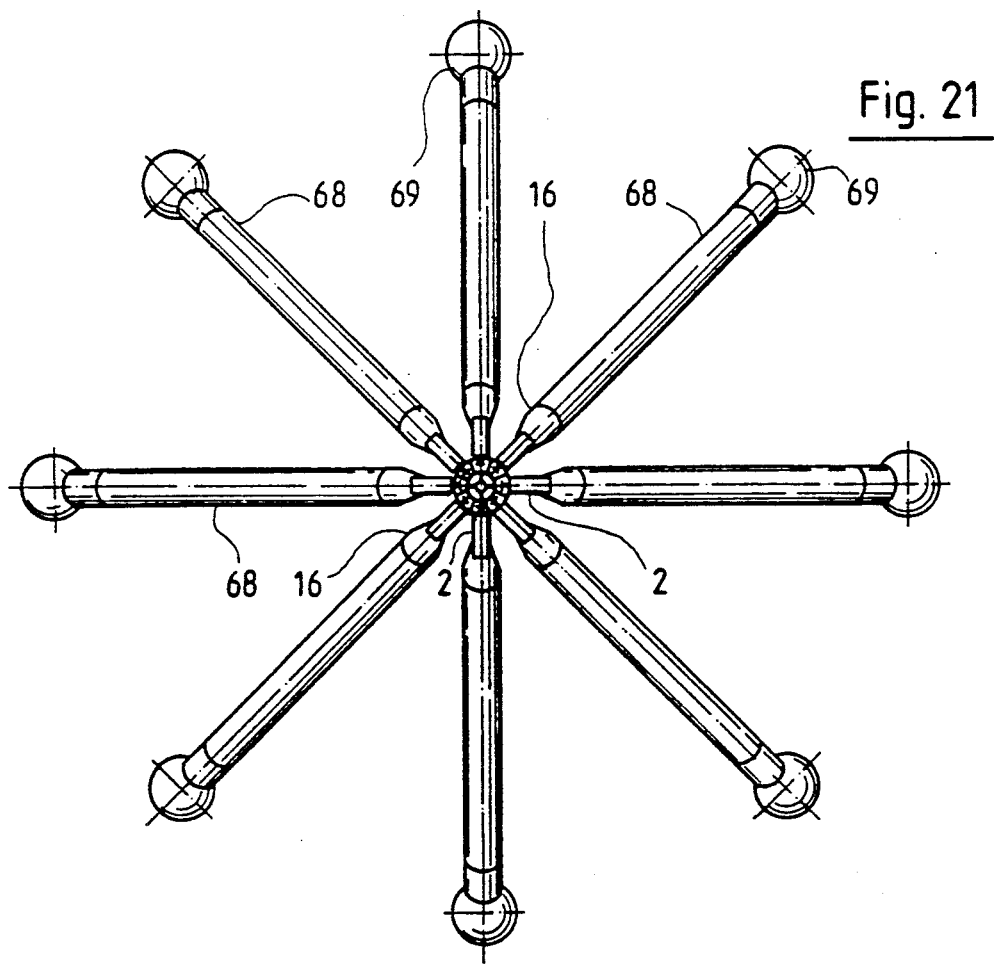

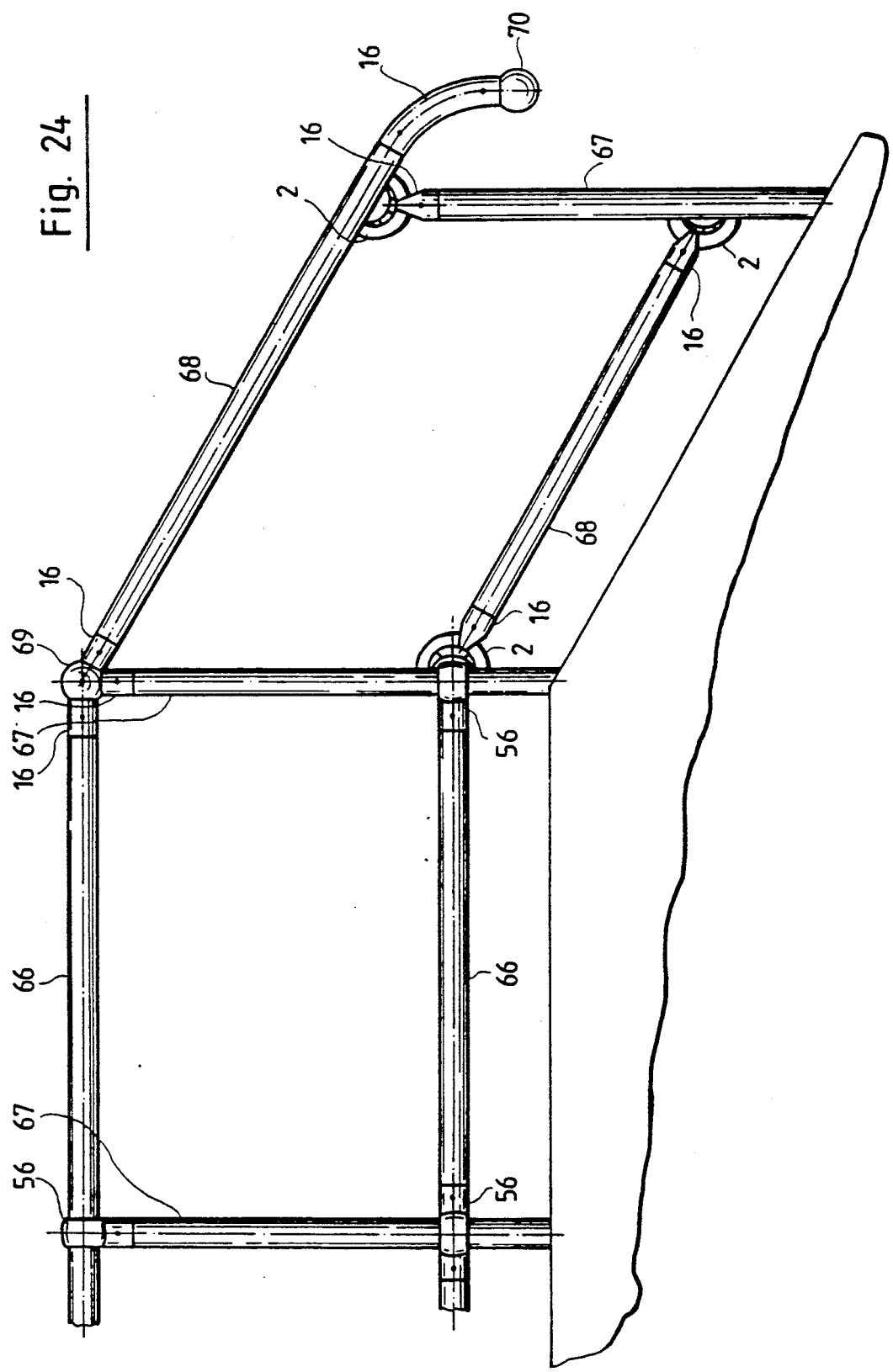

PIPE JOINT

BACKGROUND OF THE INVENTION

The invention relates to a pipe joint for forming a junction composed of several pipes equipped with a central, longitudinally extending channel.

Pipe joints are already known in many shapes and are employed for the construction of exhibition stands, scaffolding, shelving and the like. For example, DE-OS 2,950,742 discloses a pipe joint composed of a connector and at least one pipe in which an arm of the connector can be inserted into a pipe and can there be pressed to the interior wall of the pipe by means of a screw. The connector arm is here equipped with a clamping member which is disposed and guided in a receptacle in the connector and whose clamping face can be moved by means of a screw beyond the periphery of the connector arm. In order to be able to produce different connection structures for forming a junction of several pipes, the connector arm is fixed, or connected in an angularly displaceable manner, to a T-shaped, angle, cross or star element or the like. Aside from the necessity to provide a special connector arm with an associated clamping member for each individual pipe connection of such pipe joints, it is additionally necessary to employ special connecting members for each separate type of pipe junction, which is relatively expensive.

SUMMARY OF THE INVENTION

It is the object of the invention to provide a pipe joint of the above-mentioned type which is structurally simple, can be employed for pipe joints at any desired angle and is, at the same time, reliably fixable and easily releasable.

This is accomplished according to the invention in that each pipe is connected with the continuous or discontinuous peripheral extension of a connecting element by way of a connecting member inserted into the channel from the frontal face and a clamping device composed of two oppositely disposed clamping jaws which are held together by a screw connection.

The inventive configuration of the pipe joint composed of few, simply configured individual components permits, without problems, the establishment of the most varied shapes of pipe joints, i.e. the most varied angular positions between several pipes that are connected at their front ends. It is merely necessary, after insertion of the connecting members into the pipes and insertion of the clamping devices between these connecting members and the peripheral extension of the connecting element, to bring the pipes into the desired angular position relative to one another and then tighten the screw connection of the clamping devices, thus bringing the pipes in firm contact with the frontal faces of the clamping jaws of the associated clamping device and bringing the interior faces of the clamping jaws of the clamping device in firm contact with the peripheral extension of the connecting element. To adjust the pipe connection, it is merely necessary to loosen the screw connections of the clamping devices until the clamping devices can be pivoted on the peripheral extension of the connecting element into the new, desired position and then to tighten the screw connections again.

In order to permit an infinite displacement of the pipes relative to one another over the largest possible angular range, a feature of the invention provides that the connecting element is configured as a disc-shaped semicircular or fully circular connecting element in which the extension in each case extends peripherally over the circular arc.

According to an advantageous feature of the invention, it is provided that the free end of the connecting member is equipped with two superposed, continuous detent tabs which engage in correspondingly shaped, continuous grooves in the oppositely disposed interior faces of the clamping jaws of the clamping device; the arcuate extension of the semicircular and the fully circular connecting element is provided on each longitudinal side with continuous toothing composed of two teeth which engage in corresponding, continuous recesses in the interior faces of the clamping jaws of the clamping device; and the clamping jaws of the clamping device can be clamped together with the connecting member and the extension of the semicircular and the fully circular connecting element, respectively, by means of the screw connection. These structural features produce a particularly highly stressable connection between the pipe and the connecting element. Additionally, the circular configuration of the detent tabs and the associated grooves makes it possible for the pipe to rotate relative to the clamping device if the clamping device is not in a tightened state.

As a further feature of the invention, the detent tabs of the connecting member have a frustoconical cross-sectional configuration and are each provided, along their broadsides, with a sloped undercut which engages behind a corresponding step at the associated continuous groove in the clamping jaws of the clamping device. This, on the one hand, facilitates the connection process and, on the other hand, enlarges the clamping surface. The sloped configuration of the undercut region of each detent tab serves to compensate for tolerances.

To further enlarge the clamping surface and to further facilitate the connection process, the undercut of the interior detent tab of the connecting member changes to a frustoconical plug-in region, with a correspondingly frustoconical insertion opening being provided in the interior of the clamping jaws of the clamping device.

For the purpose of a simple connection between the connecting member and the pipe, the plug-in region of the connecting member preferably changes centrally into a threaded stem which engages in the channel of the pipe and forms a continuous shoulder which lies against the frontal face of the channel of the pipe. Advisably, the threaded stem of the connecting member is provided with a self-cutting thread and a blind hexagon socket hole is provided in the frontal face of the exterior detent tab so as to accommodate a correspondingly configured Allan key.

In order to permit the most space saving arrangement of the clamping device, the clamping device includes a cylindrical region whose frontal face lies against the frontal face of the pipe wall and a conical region whose frontal face has an arcuate configuration and lies against the exterior of the semicircular connecting element and the fully circular connecting element, respectively. Advisably, the screw connection for the two clamping jaws which extends through the cylindrical region of the clamping device, is composed of a hexagonal socket screw whose head is supported in a screw head receptacle of the one clamping jaw and whose threaded stem engages in a threaded bore of the other clamping jaw. To facilitate assembly, a holding disc is disposed loosely on the shaft of the hexagonal socket screw provided between the screw head and the threaded stem. This holding disc engages in a corresponding recess in the interior of the clamping jaw accommodating the threaded stem.

To increase the transfer of forces, the extension of the semicircular and the fully circular connecting elements are provided with a plug-in region having a conical cross section and extending to its toothing. This plug-in region has a associated correspondingly shaped conical insertion opening in the interior faces of the clamping jaws of the clamping device. Moreover, on its lateral faces, the semicircular and the fully circular connecting elements are provided with marking grooves which converge toward one another at an angle of 45°. These marking grooves facilitate the customary setting of angles between pipes to be connected.

In order to be able to connect the pipes to another pipe at their frontal faces and also along their longitudinal sides, an advantageous feature of the invention provides that, at the end of its straight side, the semicircular connecting element is given dovetailed feet which engage in a correspondingly configured longitudinal groove in a pipe provided with a central channel, with the semicircular connecting element being clamped together with the pipe by way of headless screws which extend through the feet and the extension. Advisably, the longitudinal groove of the pipe is formed between two of three webs which hold the central channel of the pipe in its position. In order to make possible several longitudinal pipe connections in a pipe, the central channel in an alternative embodiment of the pipe is held in its position by means of four mutually 90° offset webs and the pipe is provided with two opposing longitudinal grooves or with two longitudinal grooves which are offset by 90° relative to one another or with three or four longitudinal grooves which are mutually offset by 90°. To further increase the number of longitudinal pipe connections, the pipe is configured as a dual wall pipe in which four webs that are uniformly distributed over the circumference extend between the central channel and the inner wall and eight webs that are uniformly distributed over the circumference extend between the inner wall and the outer wall, with a dovetailed longitudinal groove being inserted in the outer wall between each of these supporting webs. Advisably, a longitudinally extending flute is formed in the bottom of each longitudinal groove in the center relative to the opening gap of the longitudinal groove into which engage the tips of the headless screws of the semicircular connecting element.

In order to permit a further pipe connection in the plane of the semicircular connecting element in addition to the pipe connections supported by it, a further advantageous feature of the invention provides that the semicircular connecting element is provided with a central recess on its straight side through which passes a pipe clamp which encloses the pipe that is clamped to the semicircular connecting element by way of its longitudinal groove. The pipe clamp halves change in one piece to clamping jaws which are coupled together by way of a screw connection and whose oppositely disposed interior faces are provided at their ends with corresponding, continuous grooves for the accommodation of a connecting member inserted at the end face into the central channel of a further pipe.

In an alternative embodiment of the pipe clamp, the latter is provided with two oppositely disposed pairs of clamping jaws which are each coupled together by a screw connection for the respective front-end connection of a pipe. In this way, two additional, oppositely disposed pipes can be connected to the longitudinal side of a pipe in the plane of the semicircular connecting element. In another alternative configuration of the pipe clamp, the latter includes three mutually 90° offset pairs of clamping jaws, each coupled in by means of a screw connection, for the respective connections of the frontal face of a pipe. This makes possible the additional connection of three pipes in the plane of the semicircular connecting element. Another possibility of increasing the number of pipe connections in the plane of the semicircular connecting element resides in that a connecting member is centrally inserted into the arcuate exterior face of the pipe clamp and is connected, by way of a clamping device, with the connecting member inserted at the end face into the central channel of a further pipe.

In another advantageous embodiment of the subject matter of the invention, the lateral faces of the fully circular connecting element are spherical and are provided with one or several threaded bores oriented toward the center of the fully circular connecting element. Connecting members are inserted into these threaded bores and are each connected by way of a clamping device with a connecting member which is inserted at the end face of the central channel of a further pipe. This makes it possible to attach further pipe connections to the fully circular connecting element, at the continuous extension of the fully circular connecting element, in addition to the pipe connections lying in one plane, at offset angles to these pipe connections. To increase the transfer of forces, the connecting members inserted into the lateral faces of the fully circular connecting element preferably have a conical shape between the plug-in region and the threaded stem, with such cone engaging in a corresponding recess in the associated threaded bore of the fully circular connecting element. Advisably, the threaded bores in the fully circular connecting element which are not needed are sealed by a blind plug.

BRIEF DESCRIPTION OF THE DRAWINGS

The idea on which the invention is based will be discussed in greater detail in the description that follows, reference being made to several embodiments which are illustrated in the drawing figures. It is shown in:

FIGS. 13 to 18 are cross-sectional views of differently configured pipes for the connection of semicircular and fully circular connecting elements;

FIG. 20 is a front view of a tent-like pipe grid produced with the aid of semicircular connecting elements;

FIG. 21 is a front view of the pipe grid of FIG. 20 when seen in the direction of arrow XXI;

FIG. 24 is an illustration of a banister produced with the aid of semicircular connecting elements;

DESCRIPTION OF THE PREFERRED EMBODIMENTS

Figure 1:
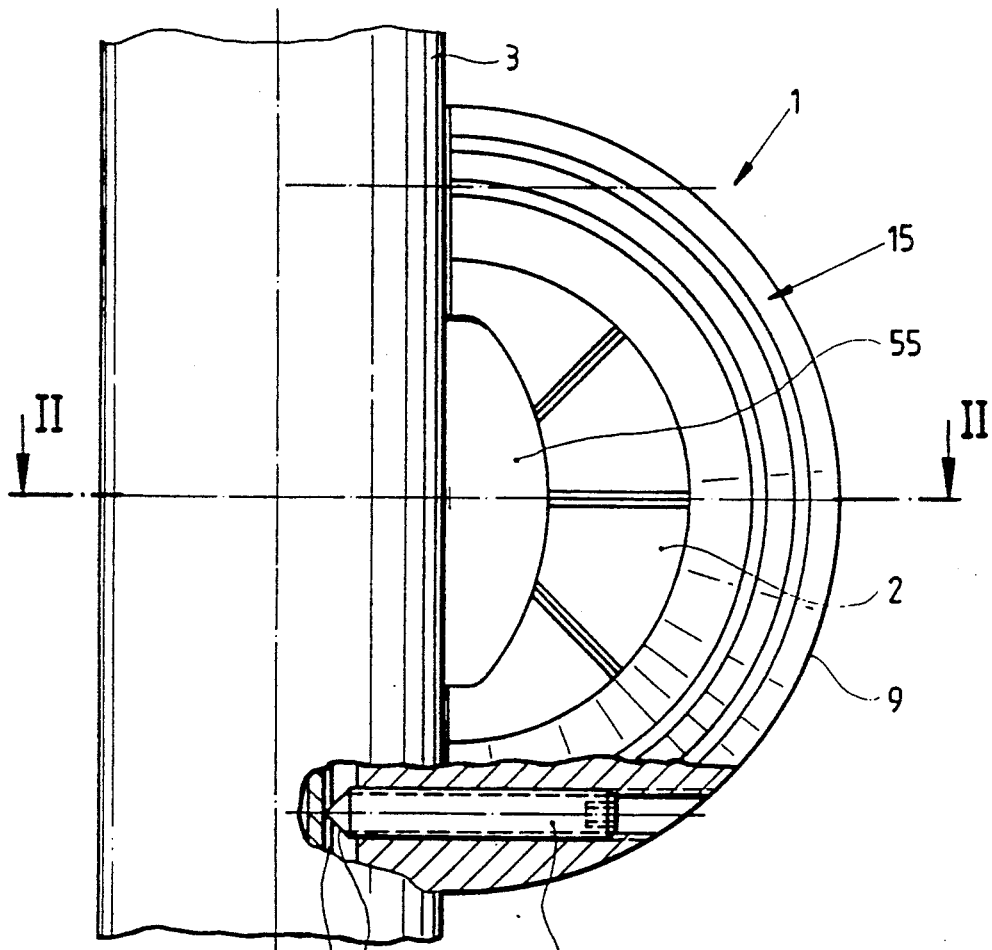
FIG. 1 is a partial sectional view of the connection of a semicircular connecting element according to the invention to the longitudinal side of a pipe.
Figure 2:
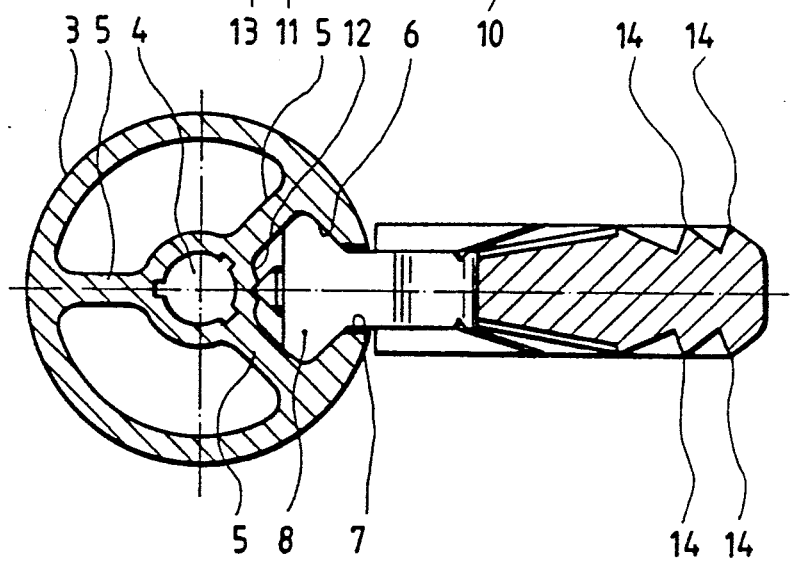
FIG. 2 is a sectional view taken along line II—II of FIG. 1.

The connecting element 1 shown in FIG. 1 is configured as a semicircular connecting element 2 and is fastened to the longitudinal side of a pipe 3. The pipe 3 has an interior with a central longitudinal channel 4 which extends through an inner tube that is held in position by means of three webs 5. Between two adjacent webs 5, there is disposed in pipe 3 dovetailed longitudinal groove 6 having an opening gap 7. Two correspondingly dovetailed feet 8 belonging to semicircular connecting element 2 are inserted into longitudinal groove 6 from the end or end face of pipe 3. The end of each foot 8 is disposed at the straight side of semicircular connecting element 2. Headless screws 10 which extend through feet 8 and a peripheral extension 9 of semicircular connecting element 2 serve to fasten semicircular connecting element 2 in the desired position at pipe 3. The tips 11 of headless screws 10 here engage in a flute 13 disposed in the bottom 12 of longitudinal groove 6.

Figure 3:
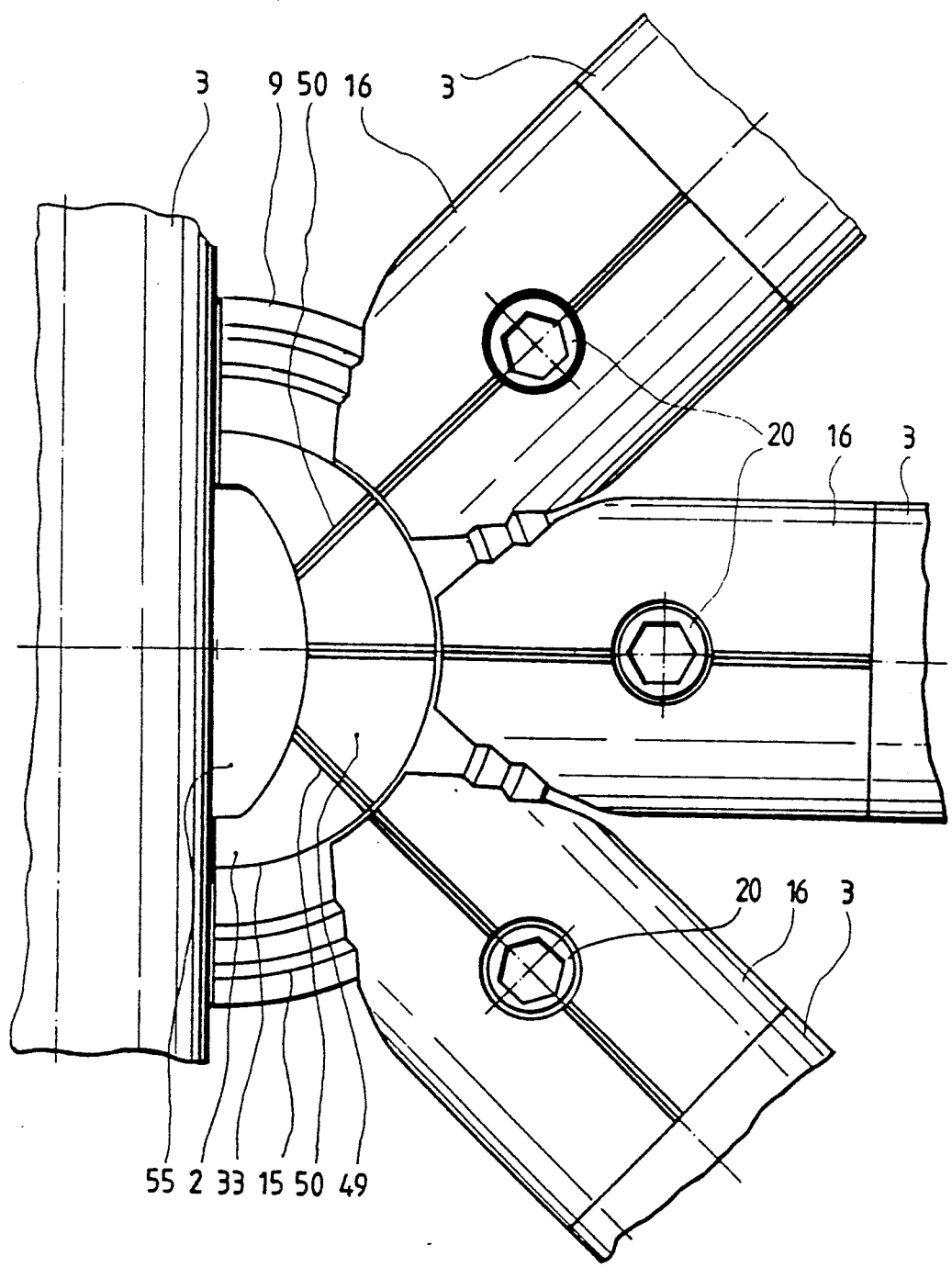
FIG. 3 is a view of the structure shown in FIG. 1 along with several pipe connections at the semicircular connecting element.

The peripheral extension 9 of semicircular connecting element 2 is provided on each longitudinal side with toothing 15. Toothing 15 is composed of two teeth 14 to which are connected by way of one or more clamping devices 16 (see FIG. 3) the end faces of a corresponding number of pipes 3 with or without longitudinal grooves 6, with the end face of a connecting member 17 (see FIG. 4) that cooperates with the associated clamping device 16 being inserted into each pipe 3.

The free end of each connecting member 17 is provided with two superposed, continuous detent tabs 18 which engage in correspondingly shaped, continuous grooves 19 in the oppositely disposed interior faces of clamping jaws 21, 22 of the clamping device 16 which are coupled together by a screw connection 20. At its broadside, each detent tab 18, which has a frustoconical cross section, is provided with an oblique undercut 23 which engages behind a corresponding step 24 at the associated, continuous groove 19 in clamping jaws 21, 22 of clamping device 16. The undercut 23 of the interior detent tab 18 is followed by a frustoconical plug-in region 25 which engage in a correspondingly frustoconically configured insertion opening 26 in the interior faces of clamping jaws 21, 22 of clamping device 16. While forming a continuous shoulder 27 which lies against the end face of the tube in the center of pipe 3, plug-in region 25 of connecting member 17 is followed in the center by a threaded stem 28 which is screwed into an associated threaded bore 29 in channel 4. Threaded stem 28 may also be provided with a self-cutting thread in which case the provision of threaded bore 29 is unnecessary. A hexagonal socket blind hole 30 to accommodate a corresponding screw driver is disposed in the end face of the exterior detent tab 18.

Clamping device 16 includes a cylindrical region 31 through which extends screw connection 20 and a conical region 32 facing semicircular connecting element 2. The frontal face or end of conical region 32 of clamping device 16 lies in an arcuate configuration against the exterior face 33 of a semicircular connecting element 16 while the frontal face or end of the cylindrical region 31 of clamping device 16 lies against the frontal face or end of the wall of pipe 3. Continuous recesses 34 which, in conical region 32, correspond with the teeth 14 of toothing 15 of the extension 9 of semicircular connecting element 2, are inserted into the interior faces of clamping jaws 21, 22 of clamping device 16. Between its toothing 15 and the exterior face 33 of semicircular connecting element 2, extension 9 on semicircular connecting element 2 is provided with a plug-in region 35 which has a conical cross section and an associated correspondingly shaped conical insertion opening 36 in the interior faces of clamping jaws 21, 22 of clamping device 16.

The screw connection 20 of clamping device 16 is composed of a hexagonal socket screw 37. Clamping jaw 21 has a screw head receptacle 38 at whose shoulder 39 the head 40 of screw 37 is supported as well as a correspondingly smaller diameter passage bore 41 for the shaft 42 of screw 37. The other clamping jaw 22 has a threaded bore 43 for accommodating the threaded stem 44 following the shaft 42 of screw 37. A holding disc 45 is arranged loosely on the shaft 42 of screw 37 so as to engage in a corresponding recess 46 in the interior face of clamping jaw 22. Clamping jaws 21, 22 are configured in such a manner that, in the assembled state of clamping device 16 and with screw connection 20 tightened, a narrow gap 47 remains between facing interior faces of clamping jaws 21, 22.

Figure 4:
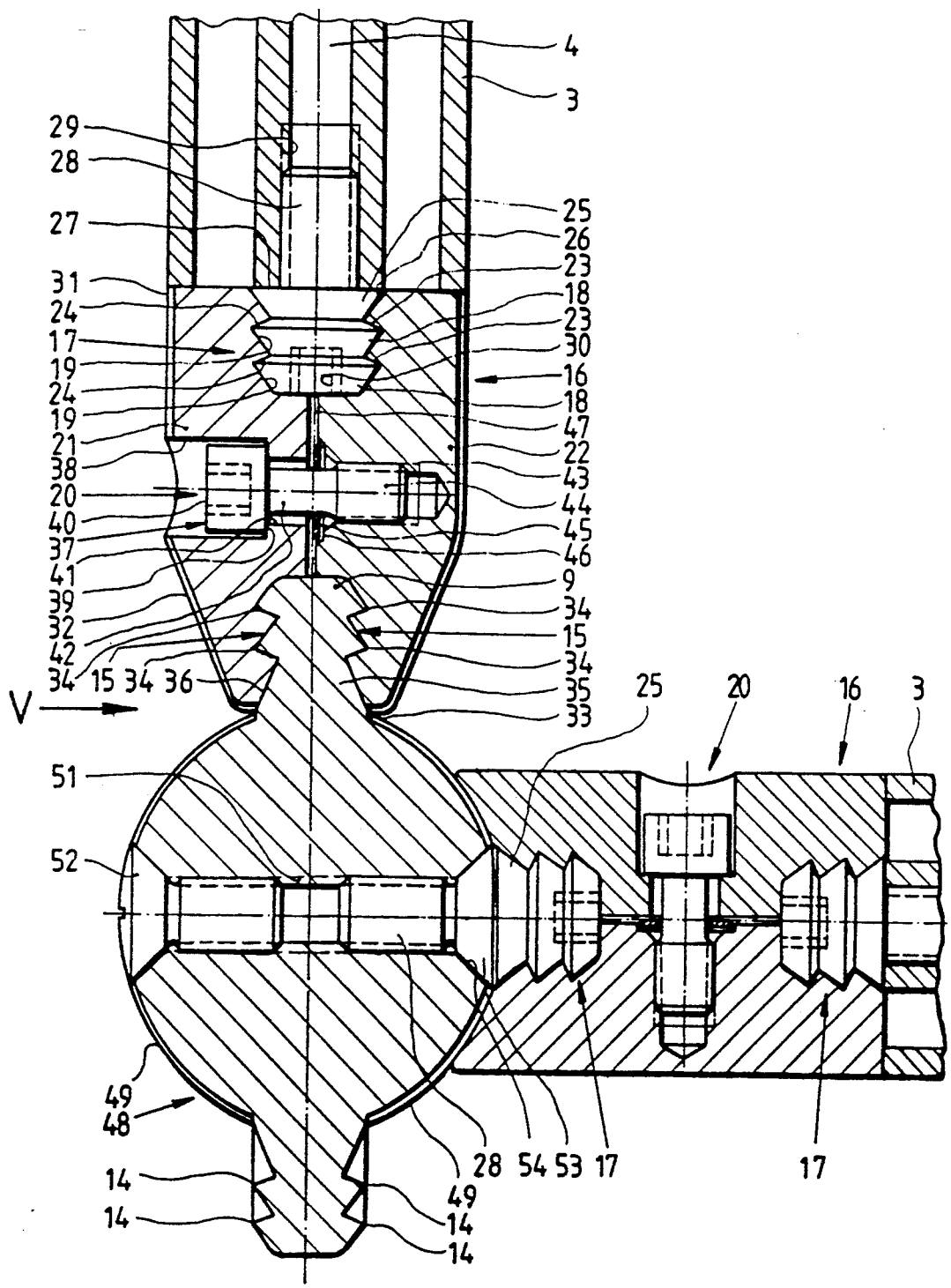
FIG. 4 is a cross-sectional view of a fully circular connecting element according to the invention together with two possible pipe connections.
Figure 5:
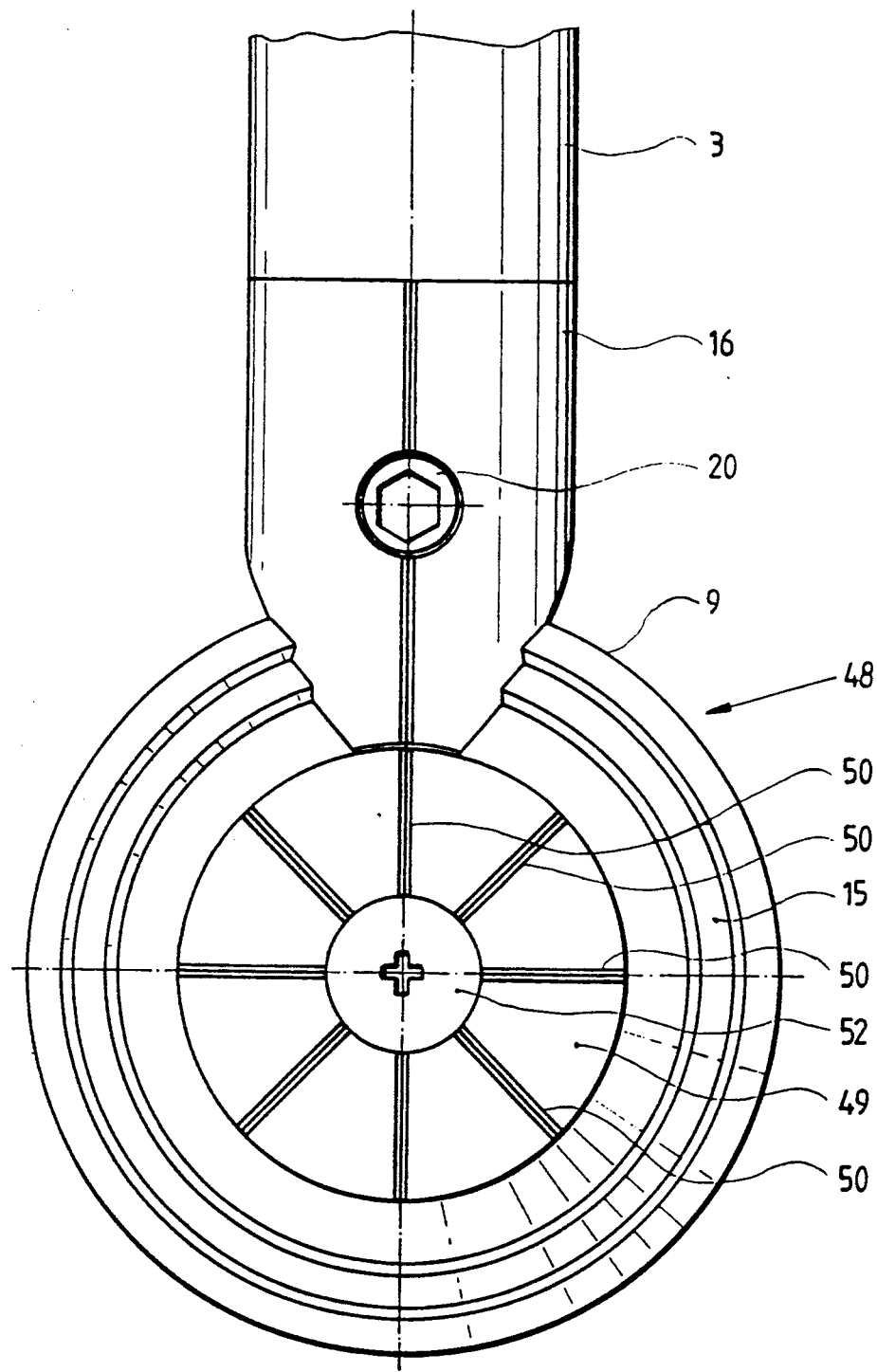
FIG. 5 is a front view of the structure illustrated in FIG. 4 when seen in the direction of arrow V.
Figure 6:
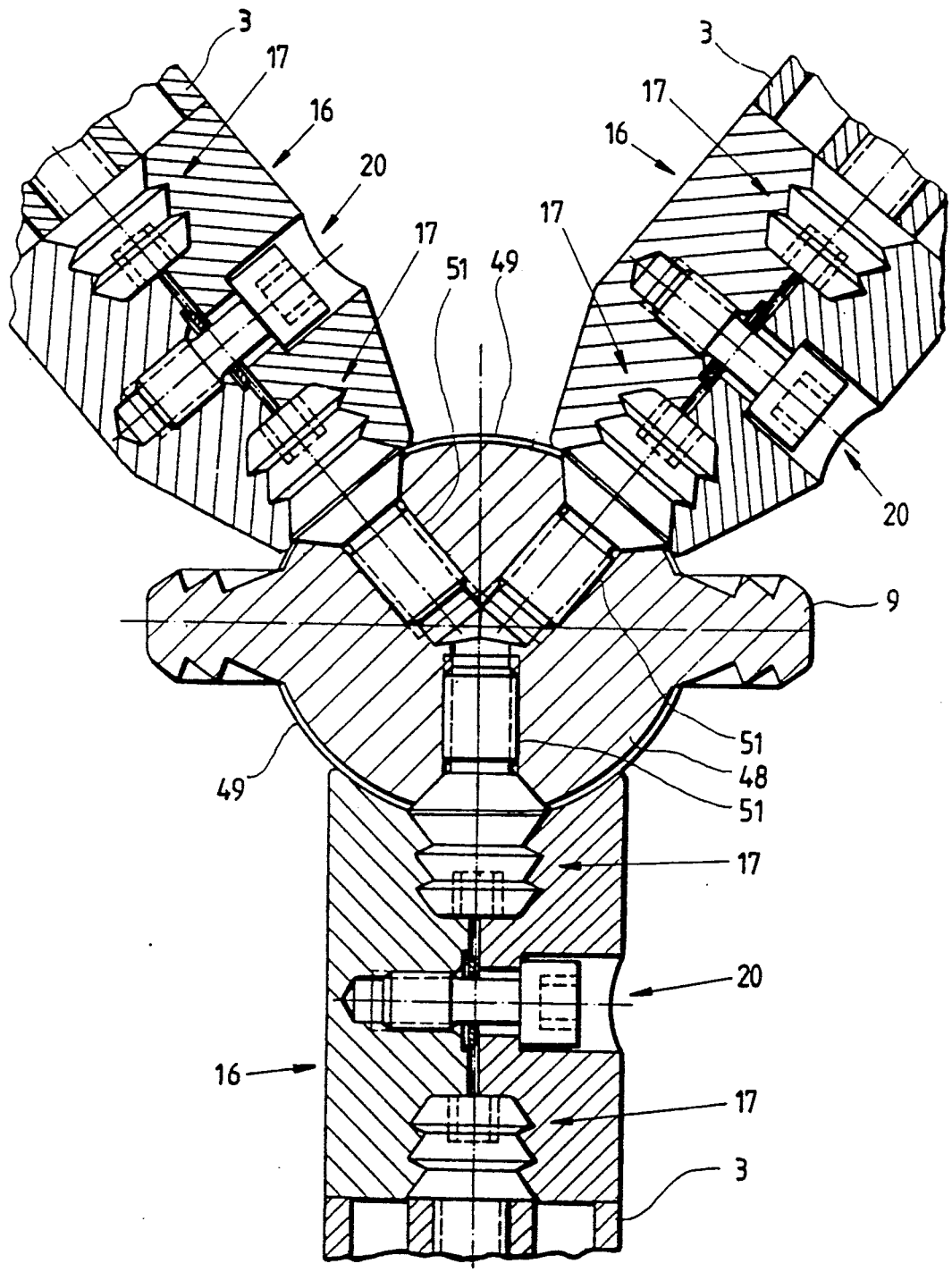
FIG. 6 is a cross-sectional view of the fully circular connecting element together with three possible additional pipe connections.

The fully circular connecting element 48 shown in FIG. 4 is configured analogously to semicircular connecting element 2, but instead of feet 8 of semicircular connecting element 2, fully circular connecting element 48 has a 360° continuous extension 9 to which pipes 3 can be fastened, in the manner described above, at any desired angle to one another by means of clamping devices 16. To facilitate the customary angular positions of pipes 3 relative to one another, marking grooves 50 (see FIG. 3) are applied t the side faces of semicircular connecting element 2 and fully circular connecting element 48 so as to extend at an angle of 45° relative to one another. The side faces 49 of fully circular connecting element 48 are spherical and are provided with a continuous, central threaded bore 51 which extends at a right angle to extension 9. A blind plug 52 is inserted from the one side into threaded bore 51 so as to be flush with side face 49 and a connecting member 17 is screwed in from the other side. This connecting member 17 has a conical shape 53 between its plug-in region 25 and threaded stem 28 so as to engage in a corresponding recess 54 in threaded bore 51. This connecting member 17 is connected, by way of a clamping device 16 which, as a whole, has a cylindrical shape and whose end face facing the side face 49 of fully circular connecting element 48 is adapted t the shape of this side face 49, with a connecting member 17 whose end face is inserted into the central channel 4 of a further pipe 3. It is of course also possible, as shown in FIG. 6, to provide several threaded bores 51 in a defined angular arrangement to one another in the side faces 49 of the fully circular connecting element, to screw the corresponding connecting members 17 into these threaded bores and to connect these connecting members 17 by way of correspondingly shaped clamping devices 1 with connecting members 17 whose end faces are inserted into pipes 3.

Figure 7:
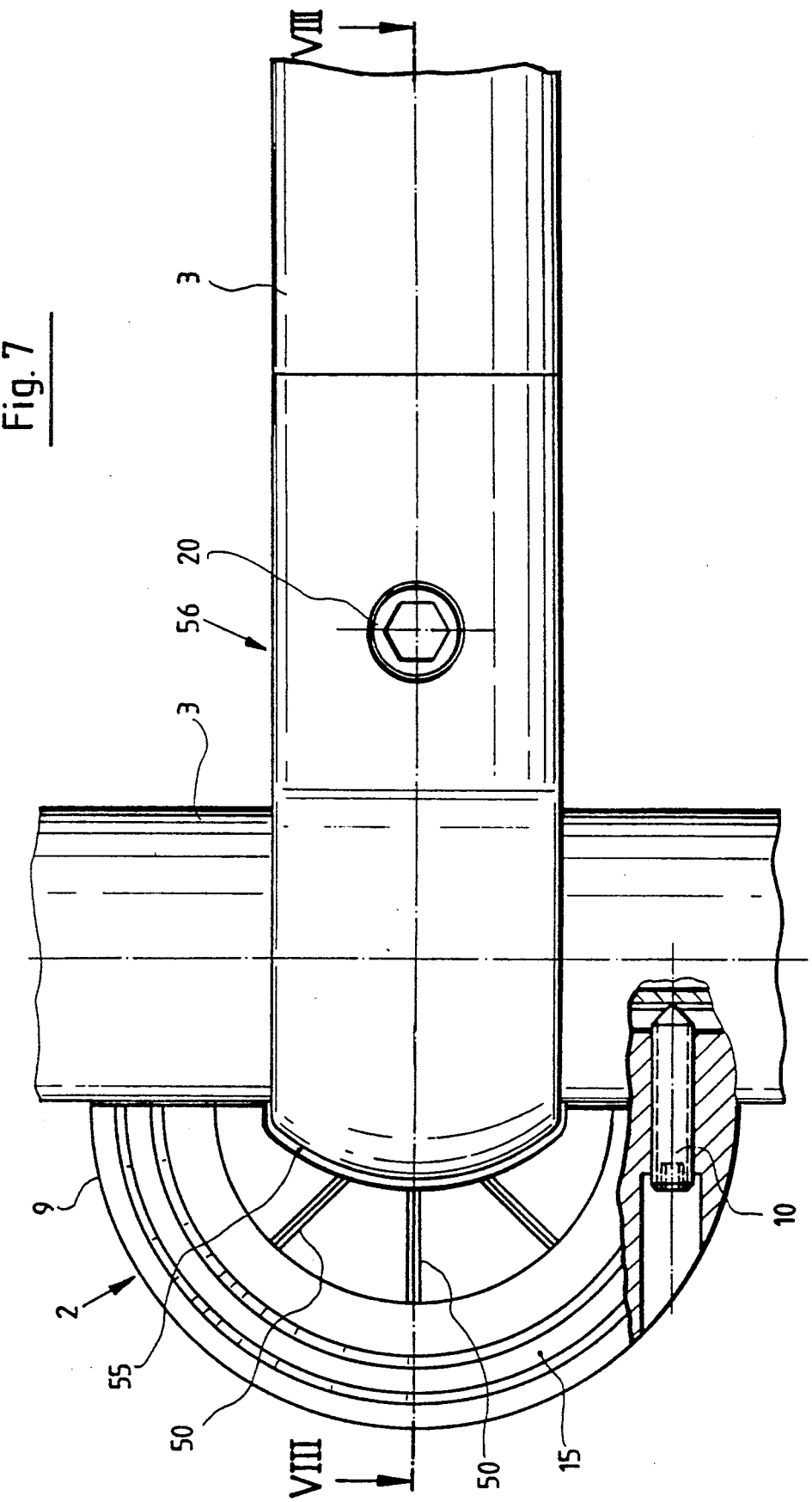
FIG. 7 is a view of the semicircular connecting element attached to the longitudinal side of a pipe together with an additional pipe connection in the plane of the semicircular connecting element.
Figure 8:
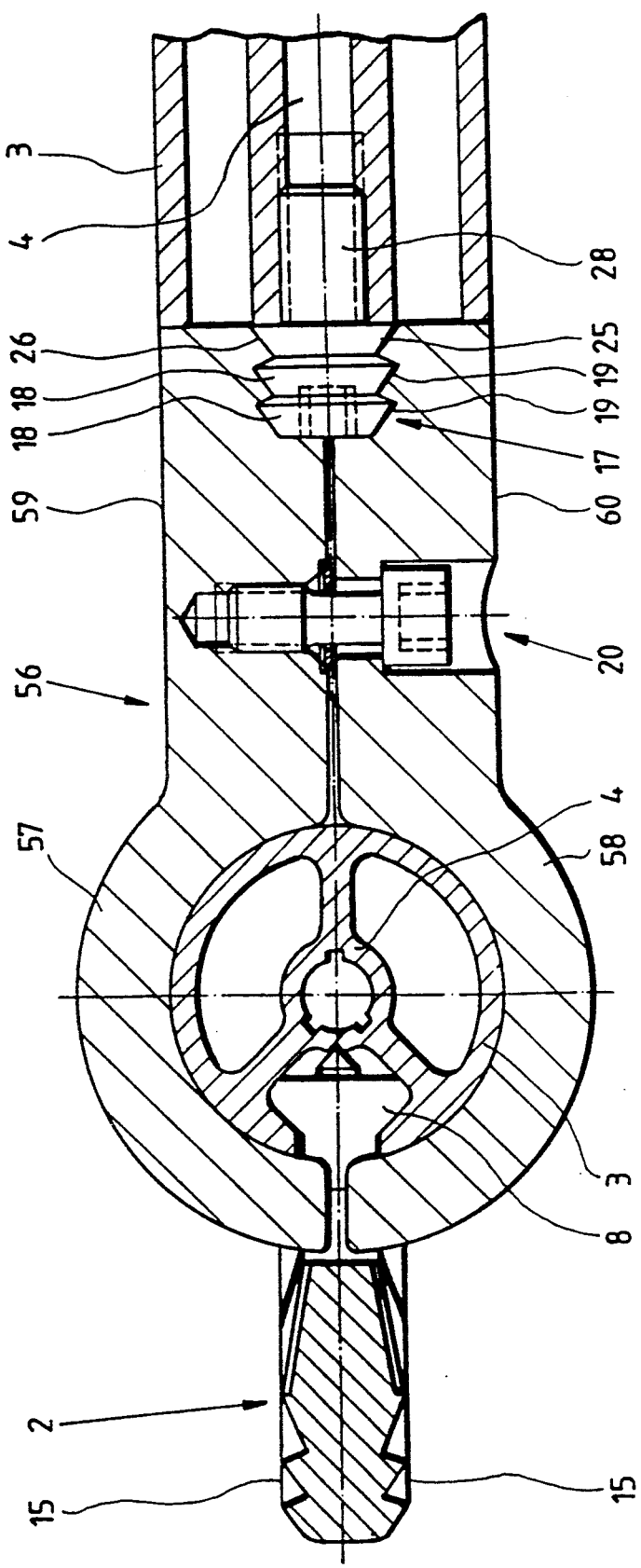
FIG. 8 is a sectional view taken along line VIII—VIII of FIG. 7.
Figure 9:
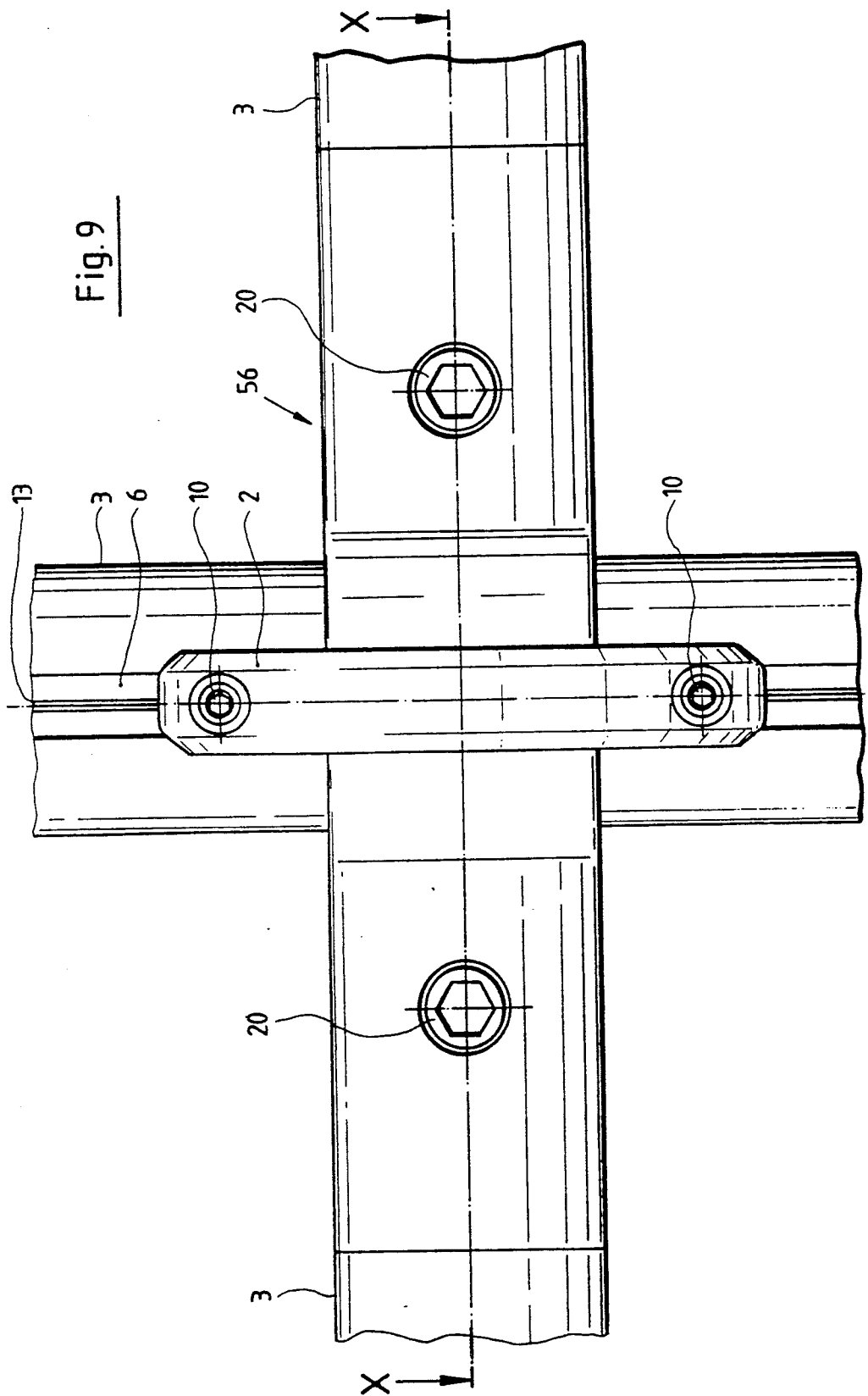
FIG. 9 is a view of the semicircular connecting element fastened to the longitudinal side of a pipe together with two additional, oppositely disposed pipe connections in the plane of the semicircular connecting element.
Figure 10:
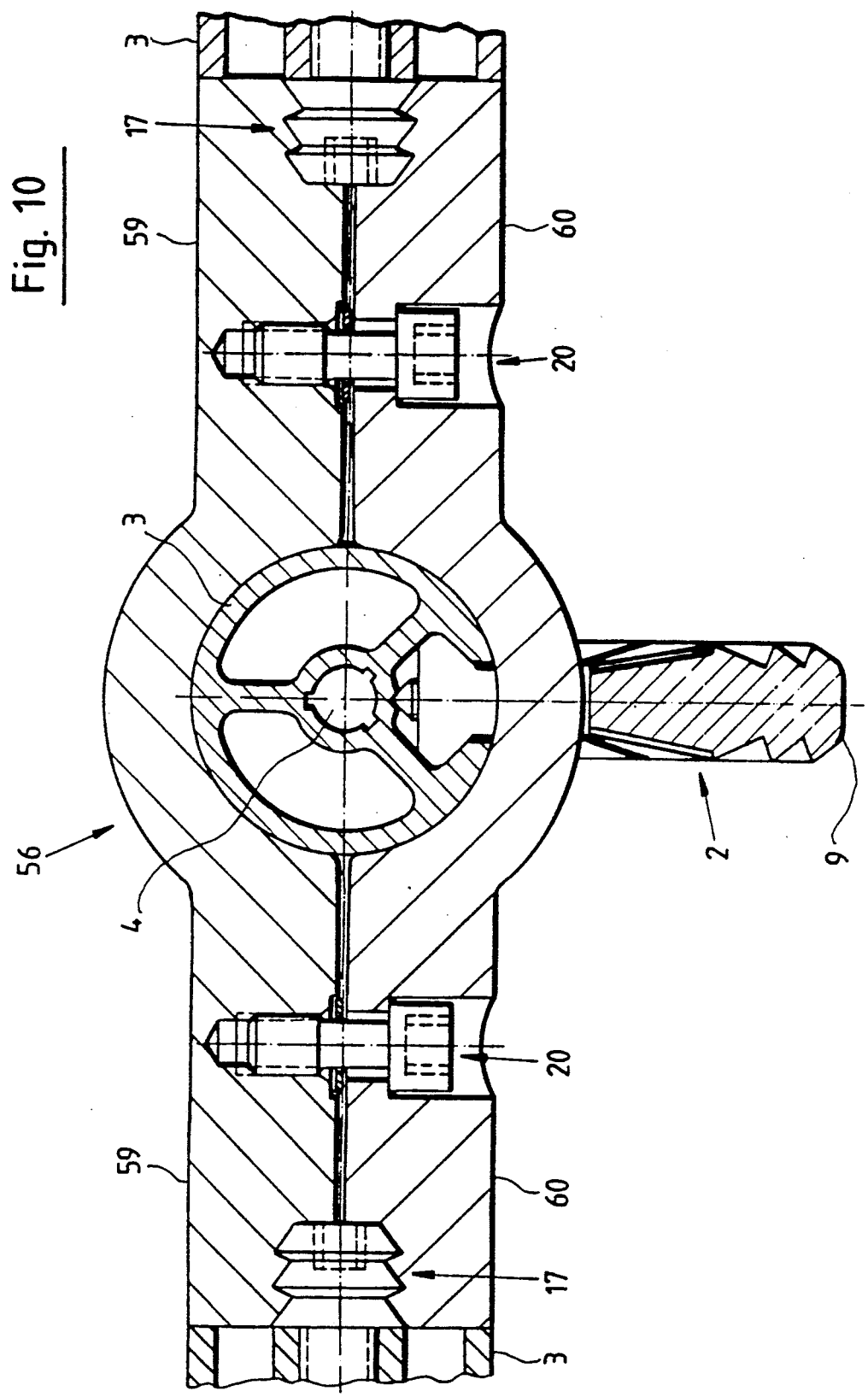
FIG. 10 is a sectional view taken along line X—X of FIG. 9.
Figure 11:
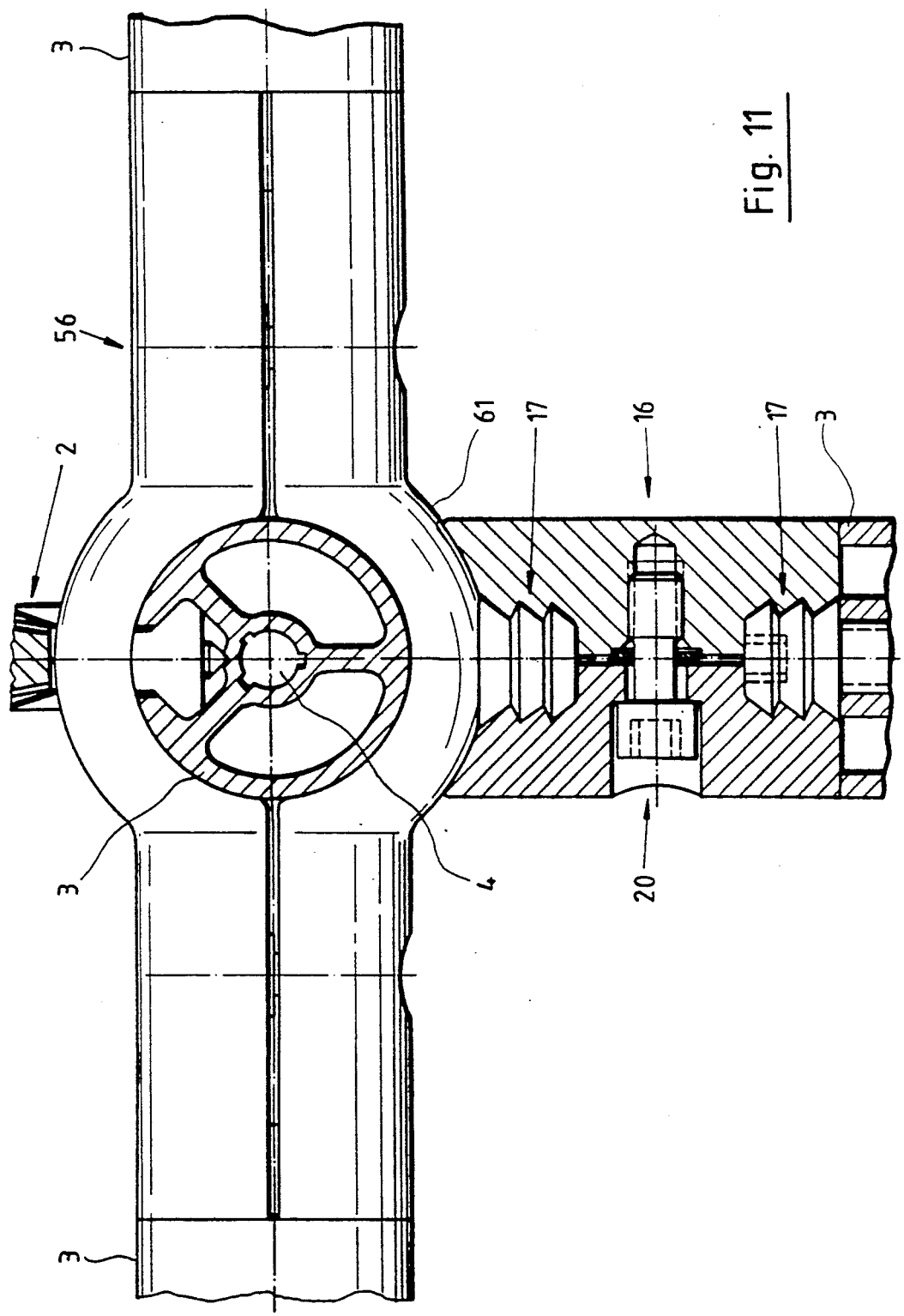
FIG. 11 is a partial sectional view of the semicircular connecting element fastened to the longitudinal side of a pipe together with three additional pipe connections disposed in the plane of the semicircular connecting element.
Figure 12:
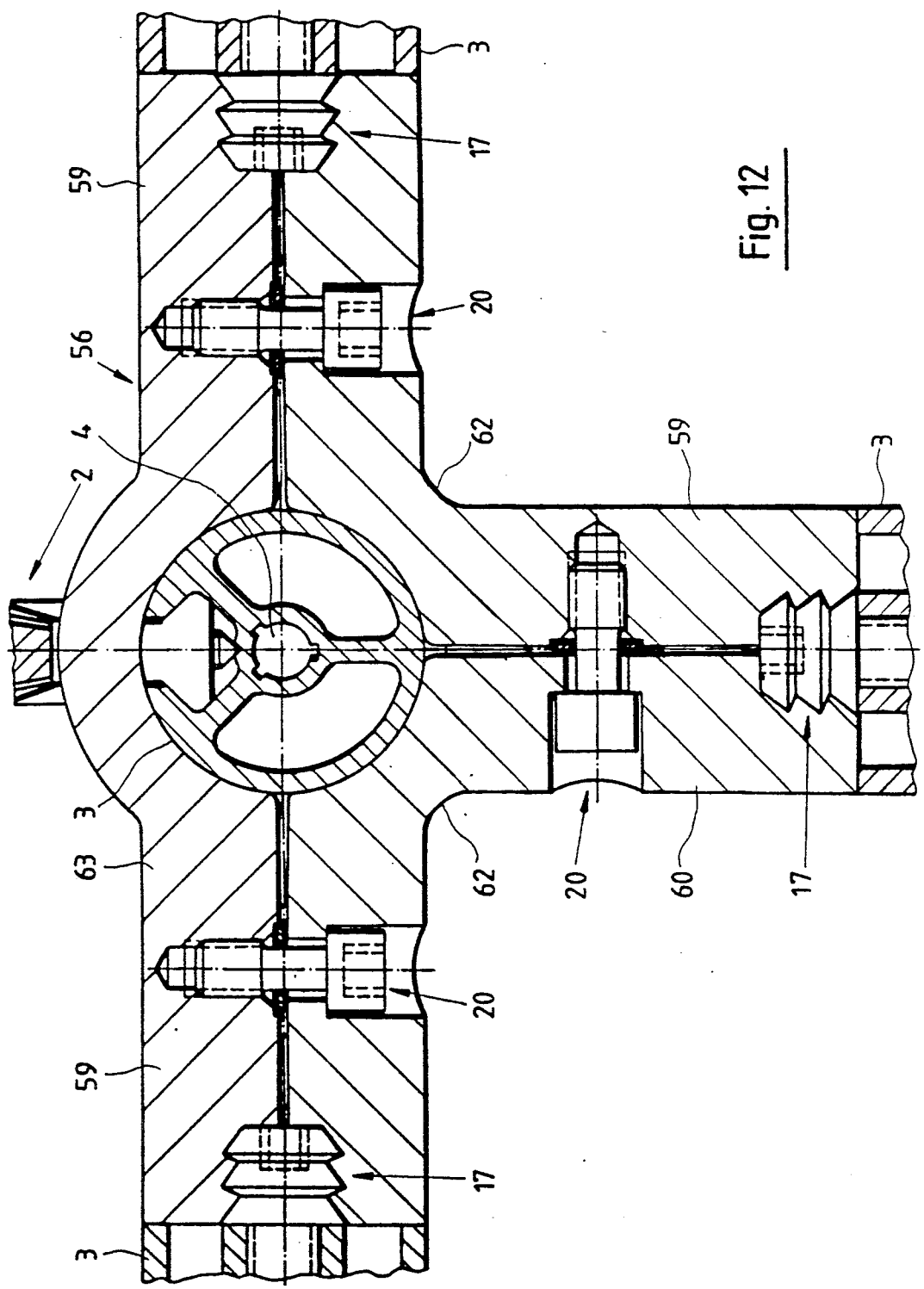
FIG. 12 is a sectional view of an alternative to the embodiment shown in FIG. 11.

At its straight side, semicircular connecting element 2 is provided with a central, arcuate recess 55. As shown in FIGS. 7 and 8, a pipe clamp 56, which encloses the pipe 3 to which semicircular connecting element is fastened and to whose free end the end face of a further pipe 3 is connected, passes through this recess 55. Each half 57, 58 of the pipe clamp changes in one piece into a clamping jaw 59, 60. The two clamping jaws 59, 60 are coupled together by means of a screw connection 20. Grooves 19 extending at the ends so as to accommodate the detent tabs and an insertion opening 26 for plug-in region 25 of a connecting member 17 which is screwed into channel 4 of pipe 3 by means of threaded stem 28 are provided in the ends of the interior faces of the oppositely disposed clamping jaws 59, 60. Pipe clamp 56 can be fastened to the pipe 3 equipped with semicircular connecting element 2 at any desired angle relative to semicircular connecting element 2. FIGS. 9 and 10 show an alternative pipe clamp 56 having two oppositely disposed pairs of clamping jaws 59 and 60, each pair coupled together by a screw connection 20, to which is connected a pipe 3 at the respective frontal faces by way of a connecting member 17. In the illustration shown in FIG. 11, a connecting member 17 which is connected by way of a clamping device 16 with the connecting member 17 inserted into the end of the channel 4 of a pipe 3 is screwed into the center of the arcuate exterior face 61 of pipe clamp 56 which corresponds to the pipe clamp embodiment of FIG. 10. A further, alternative embodiment of pipe clamp 56 is shown in FIG. 12. In this case, pipe clamp 56 includes three mutually 90° offset pairs of clamping jaws 59, 60 which are each coupled together by a screw connection 20, with pipe clamp 56 itself enclosing only two angular individual components 62 and one straight individual component 63. The end face of a pipe 3 is connected to each pair of clamping jaws 59, 60 of pipe clamp 56 by way of a connecting member 17.

In addition to the cross-sectional configuration of a pipe 3 as shown in FIG. 13 and including a longitudinal groove 6 so as to accommodate one or several semicircular connecting elements 2, it is also possible to provide pipe 3 with several longitudinal grooves 6 in order to be able to attach semicircular connecting elements 2 to pipe 3 in an angularly offset arrangement. In the possible cross-sectional configurations of pipe 3 shown in FIGS. 14 to 17, the inner tube is held in its position by four mutually 90° offset webs 5. Two oppositely disposed longitudinal grooves 6 are provided in pipe 3 of FIG. 14, two longitudinal grooves disposed at an angle of 90° to one another are provided in pipe 3 of FIG. 15, and three longitudinal grooves 6 placed at an angle of 90° to one another are provided in pipe 3 of FIG. 16, in each case between the respective webs 5. In the alternative cross-sectional configuration of pipe 3 shown in FIG. 18, pipe 3 is configured as a double wall pipe. In this pipe 3, four webs 5 which are uniformly distributed over the circumference are disposed between central channel 4 and intermediate wall 64. Between intermediate wall 64 and outer wall 65, eight webs 5 are uniformly distributed over the circumference. A dovetailed longitudinal groove 6 is formed in outer wall 65 between webs 5 supporting outer wall 65. Thus, up to eight semicircular connecting elements 2 can be attached in one cross-sectional plane of this pipe 3.

Figure 19:
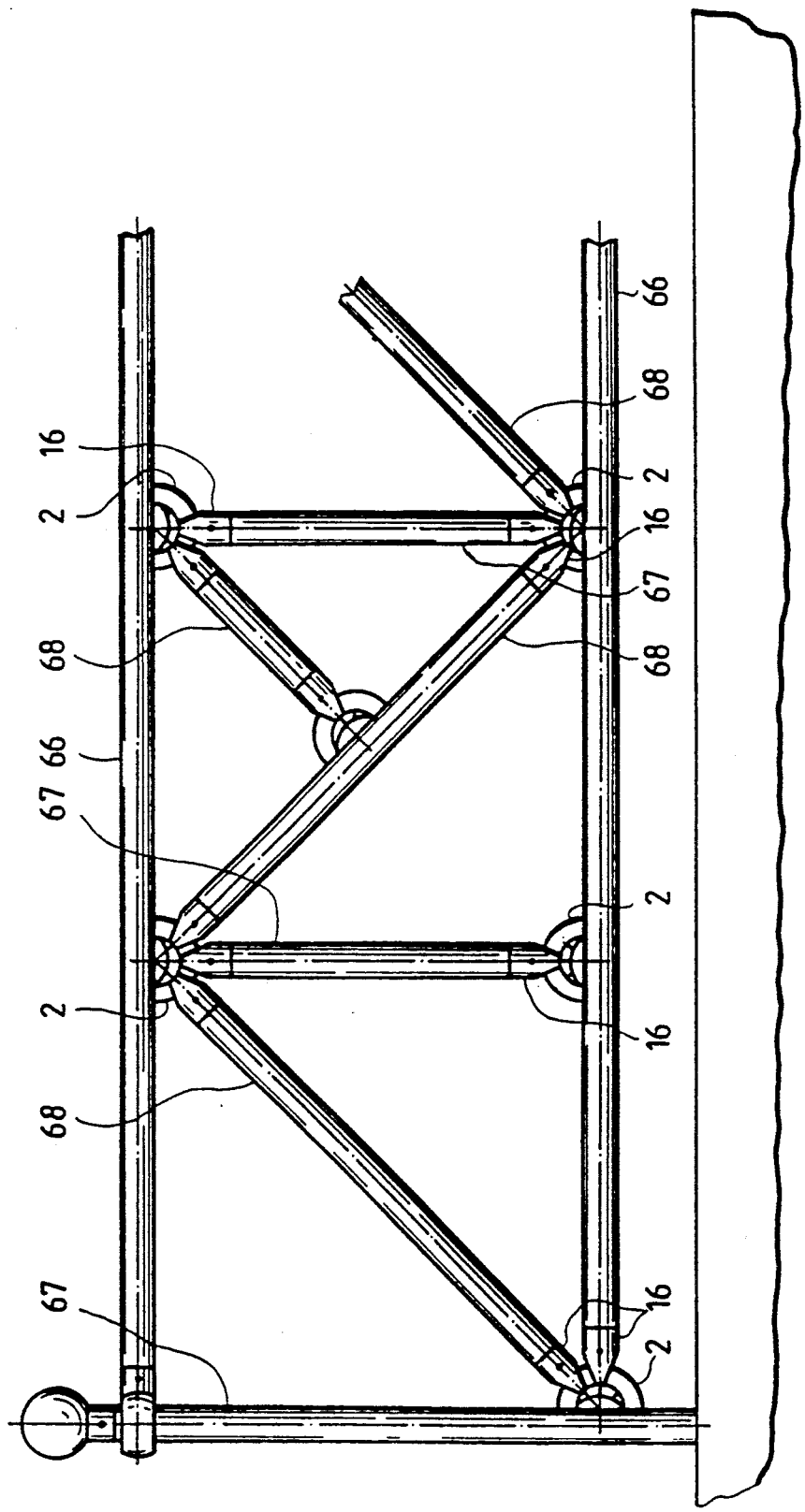
FIG. 19 is a front view of a pipe grid produced with the aid of semicircular connecting elements.
Figure 23:
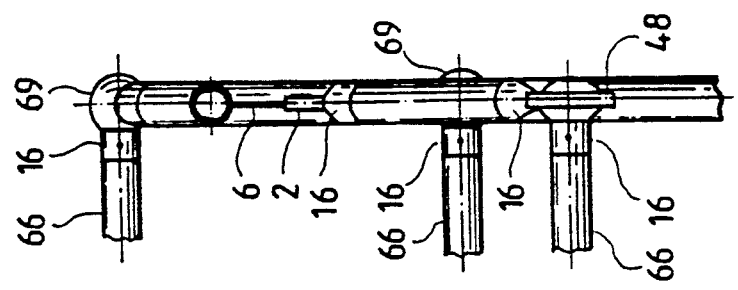
FIG. 23 is a sectional view of the grid of FIG. 22 when seen in the direction of line XXIII—XXIII.
Figure 22:
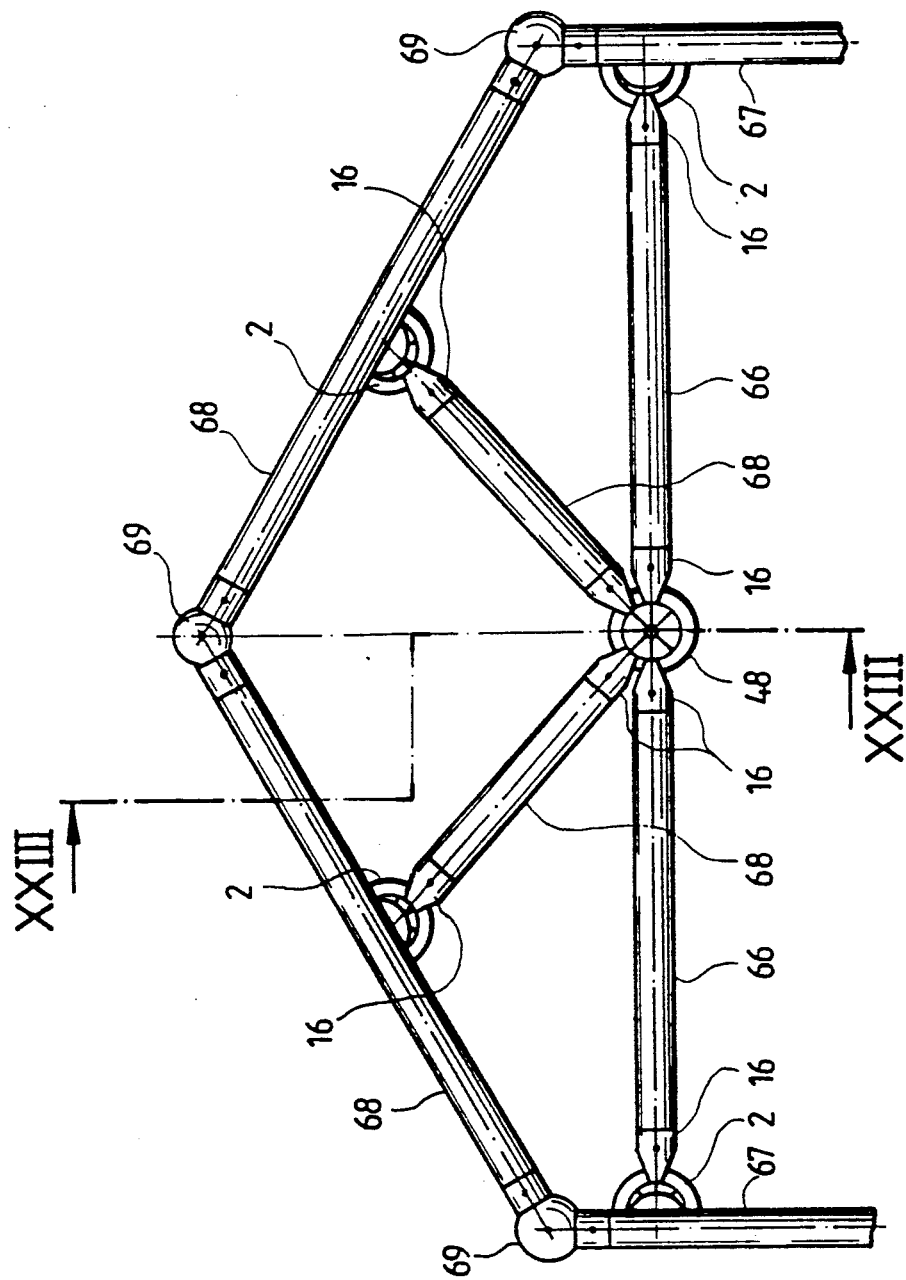
FIG. 22 is a front view of a pipe grid for a roof truss produced with the aid of semicircular and fully circular connecting elements.

In the pipe grid shown in FIG. 19, horizontal struts 66 are connected by way of appropriately arranged semicircular connecting elements 2 and associated clamping devices 16 with vertical struts 67 and with transverse struts 68. In the embodiment shown in FIGS. 20 and 21, a central pipe 3 equipped with eight longitudinal grooves 6 is provided at its upper end with eight semicircular connecting elements 2 in one plane, connected by way of clamping devices 16 with a corresponding number of outgoing transverse struts 68. The other ends of transverse struts 68 are connected by way of articulated ball connectors 69 with vertical struts 67. Below ball connectors 69, there extend horizontal struts 66 between central pipe 3 and vertical struts 67, with horizontal struts 66 again being held in position by correspondingly arranged semicircular connecting elements 2 and clamping devices 16. As a result of the pipe joint configuration according to the invention, horizontal struts 66 can be installed between central pipe 3 and vertical struts 67 without any change in spacing. The embodiment shown in FIGS. 22 and 23 shows a section of a pipe roof construction in which three mutually 90° offset horizontal struts 66 and two transverse struts 68 are attached with the aid of clamping devices 16 to one fully circular connecting element 48. The opposing horizontal struts 66 which are connected to fully circular connecting element 48 are connected at their other ends by wa of clamping devices 16 and semicircular connecting elements 2 with vertical struts 67. The upper ends of vertical struts 67 are connected by way of ball connectors 69 with transverse struts 68 and with horizontal struts 66, with these transverse struts 68 being held together in the plane of fully circular connecting element 48 by a further ball connector 69. A horizontal pipe 66 forming the gable emanates from this ball connector which connects transverse struts 68. The transverse struts 68 emanating from fully circular connecting element 48 are fastened by way of clamping devices 16 and semicircular connecting elements 2 to transverse strut 68 which are held together by ball connector 69.

Moreover, the embodiment shown in FIG. 24 illustrates a banister in which semicircular connecting elements 2 and the associated clamping devices 16 are employed to connect the vertical struts 67 with transverse struts 68. Horizontal struts 66 are connected with vertical struts 67 by way of appropriately shaped pipe clamps 56 having shaped-on clamping devices and a ball connector 69 with associated clamping devices. By way of a bent clamping device 16, a ball 70 is connected to the free end of the upper transverse strut 68 which is configured as the handrail.

Figure 25:
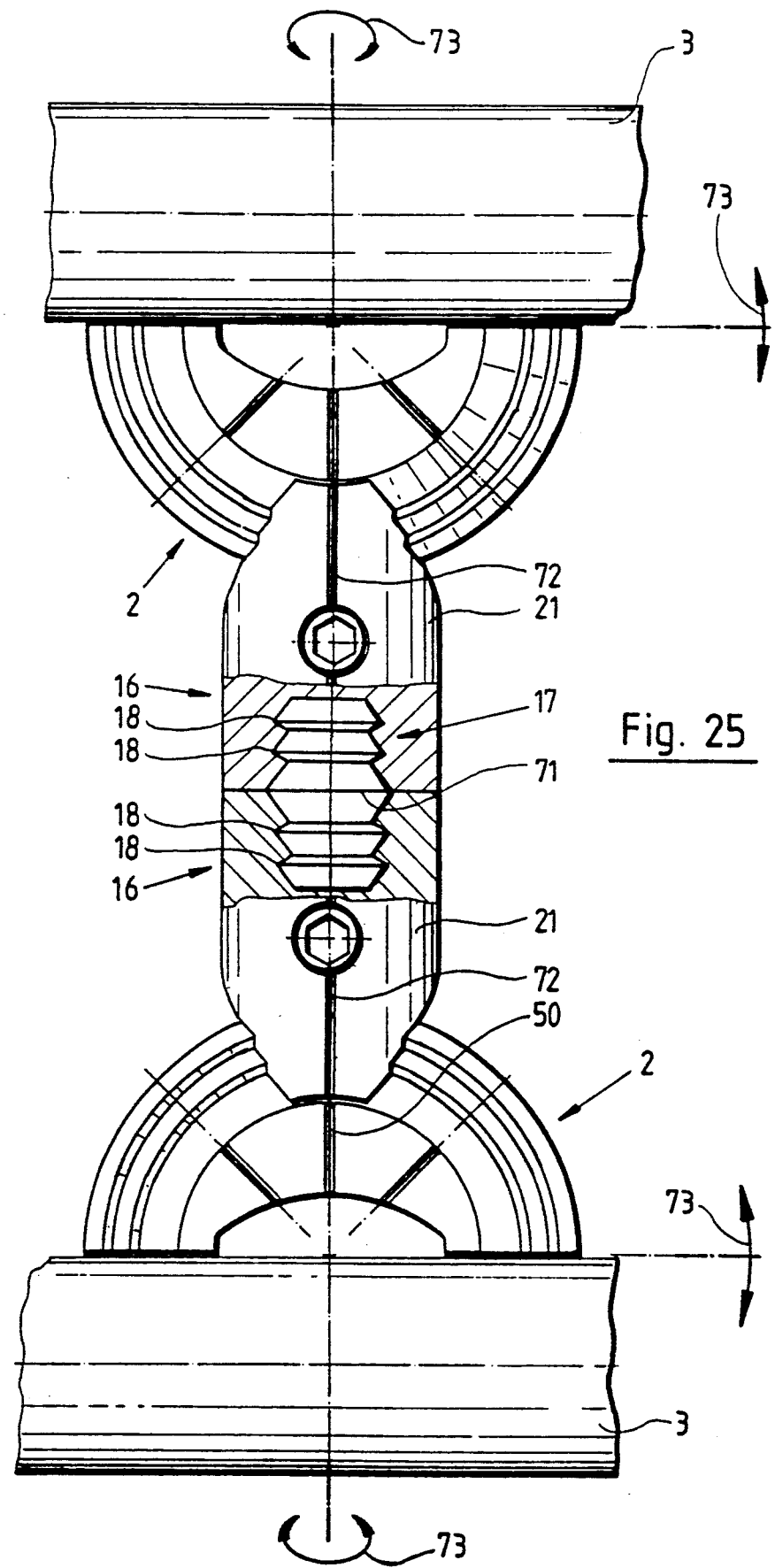
FIG. 25 is an illustration of the longitudinal connection of two pipes with the aid of two semicircular connecting elements coupled together by way of two clamping devices.
Figure 26:
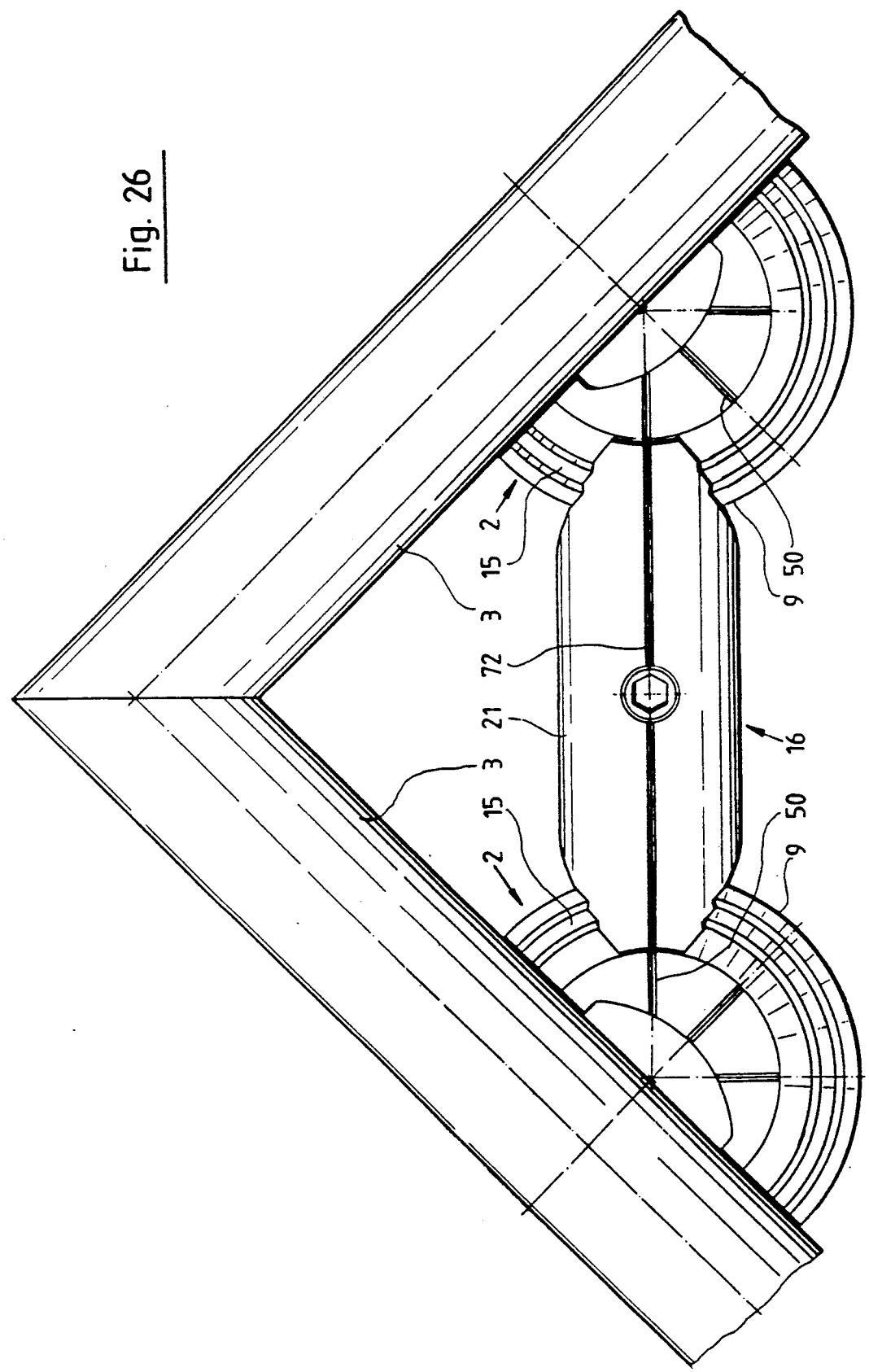
FIG. 26 is an angular butt joint connection of two pipes in which the semicircular connecting elements inserted into the longitudinal sides of the pipes are connected by means of a correspondingly configured clamping device.

In the embodiment shown in FIG. 25, two pipes 3 each support on their longitudinal sides a semicircular connecting element 2. These semicircular connecting elements are connected with one another by way of two clamping devices 16 whose end faces lie against one another. These clamping devices 16 are coupled together by way of a connecting member 17 which is configured as a body that is in mirror symmetry to its transverse axis 71 and has outwardly disposed detent tabs 18 and inwardly disposed plug-in regions (not numbered in FIG. 25, but corresponding to plug-in region 25 in FIG. 4) which are associated with corresponding grooves in clamping jaws 21, 22 of clamping devices 16. Marking lines 72 extend on the exterior in the plane of screw connections 20 of clamping devices 16. Arrows 73 indicate the possible pivoting and rotation directions of these pipe joints. In the embodiment according to FIG. 26, which is shown in a manner analogous to the pipe joint of FIG. 25, the two semicircular connecting elements 2 are coupled together by a specially configured clamping device 16 which is provided with recesses 34 (see FIG. 4) to accommodate the toothing 15 of extensions 9 of semicircular connecting elements 2 only at its end faces in clamping jaws 21, 22 which are held together by a screw connection 20.

Figure 27:
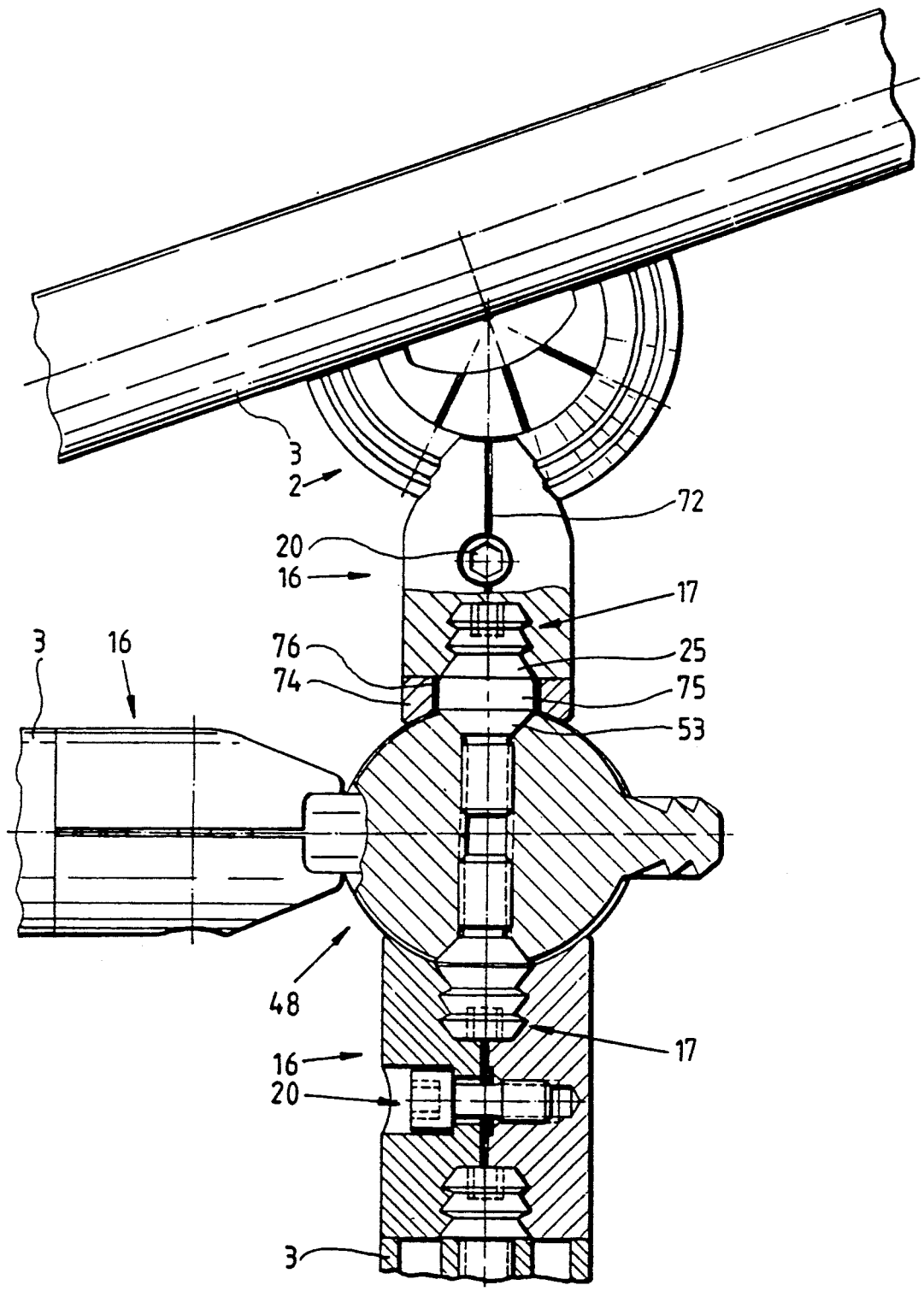
FIG. 27 is an illustration of the frontal and longitudinal connections of pipes to a fully circular connecting element.

The embodiment shown in FIG. 27 illustrates the frontal connection of two pipes 3 and the longitudinal connection of one pipe 3 to a fully circular connecting element 48. The frontal pipe connections are each made directly through respective clamping devices 16 while the longitudinal pipe connection is made by way of a semicircular connecting element 2 fastened to pipe 3, a clamping device 16 and an intermediate disc 74. Intermediate disc 74 serves to compensate for the different outlines between the exterior of fully circular connecting element 48 and the frontal face of clamping device 16. For this purpose, the side of intermediate disc 74 facing fully circular connecting element 48 is concave and the side of intermediate disc 74 facing the frontal face of clamping device 16 is planar. Consequently, in this case, connecting member 17 has a cylindrical section 75 between its plug-in region 25 and its cone 53 which in its dimensions is adapted to passage bore 76 in intermediate disc 74. Of course, intermediate disc 74 may also be employed in other pipe connections.

The described embodiments demonstrate the particularly simple and easily manipulated structure of the pipe joint according to the invention whose individual components are composed of aluminum and which, in spite of its simplicity, has proven to be particularly reliable and variable. Although the invention has been described only for a few embodiments, the person skilled in the art will derive therefrom, within the scope of the claimed pipe joint, obvious modifications of the inventive solution which result from this description.

I claim:

1. A pipe joint for forming a junction of a plurality of pipes, each having an end and having an interior which communicates with the end, said pipe joint comprising:
   a connecting element having a peripheral extension;
   means for mounting the connecting element on a first one of the plurality of pipes;
   a connecting member mounted on a second one of the pipes, the connecting member extending into the interior of the second one of the pipes through the end thereof; and
   a clamping device joining the connecting member to the peripheral extension of the connecting element, the clamping device including a pair of oppositely disposed clamping jaws and screw connection means for holding the clamping jaws together,
   wherein the connecting member has a free end which extends out of the interior of the second one of the pipes and which is provided with two superposed, continuous detent tabs,
   wherein each clamping jaw has an interior face with two continuous grooves which correspond in shape to the detent tabs and which are engaged by the detent tabs,
   wherein the peripheral extension of the connecting element has a first side with two continuous teeth and a second side with two continuous teeth, and
   wherein the interior faces of the clamping jaws additionally have continuous recesses which are engaged by the teeth on the first and second sides of the peripheral extension.

2. A pipe joint according to claim 1, wherein the grooves in the interior faces of the clamping jaws have steps, and wherein the detent tabs of the connecting member have a frustoconical cross-sectional configuration and are each provided with a respective sloping undercut, with said undercuts engaging behind the steps.

3. A pipe joint according to claim 2, wherein one of the detent tabs is an interior detent tab that is closest to the second one of the pipes, wherein the connecting member additionally has a frustoconical plug-in region which merges with the undercut of the interior detent tab, and wherein, the interior faces of the clamping jaws additionally provide a frustoconically configured insertion opening to receive the plug-in region of the connecting member.

4. A pipe joint according to claim 3, wherein the second one of the pipes comprises a pipe wall substantially encircling the interior of the second one of the pipes, a tube having a channel and having an end, and means connecting the tube and the pipe wall for mounting the tube inside the pipe wall so that the end of the tube is positioned at the end of the second one of the pipes and so that the channel of the tube is centrally disposed in the interior of the second one of the pipes, wherein the plug-in region of the connecting member has a continuous shoulder which lies against the end of the of tube, and wherein the connecting member further comprises a threaded stem which is connected to the plug-in region of the connecting member adjacent the shoulder and which extends into the channel of the tube.

5. A pipe joint according to claim 4, wherein the threaded stem of the connecting member is provided with a self-cutting thread, wherein the other one of the detent tabs is an external detent tab with an outer end, and wherein the connecting member additionally has a hexagonally configured blind bore at the outer end of the exterior detent tab.

6. A pipe joint according to claim 1, wherein the clamping device has a cylindrical region with an end which lies against the end of the second one of the pipes, and a frustoconical region with an end which lies against the connecting element, the frustoconical region of the clamping device being connected to the cylindrical region.

7. A pipe connector according to claim 6, wherein the screw connection means extends through the cylindrical region of the clamping device, and comprises a hexagonal socket screw having a head which is supported in a screw head receptacle in one of the clamping jaws and having a threaded stem which engages in a threaded bore in the other of the clamping jaws.

8. A pipe joint for forming a junction of a plurality of pipes, each having an end and having an interior which communicates with the end, said pipe joint comprising:
a connecting element having a peripheral extension;
means for mounting the connecting element on a first one of the plurality of pipes;
a connecting member mounted on a second one of the pipes, the connecting member extending into the interior of the second one of the pipes through the end thereof; and
a clamping device joining the connecting member to the peripheral extension of the connecting element, the clamping device including a pair of oppositely disposed clamping jaws and screw connection means for holding the clamping jaws together,
wherein the clamping device has a cylindrical region with an end which lies against the end of the second one of the pipes, and a frustoconical region with an end which lies against the connecting element, the frustoconical region of the clamping device being connected to the cylindrical region,
wherein the screw connection means extends through the cylindrical region of the clamping device and includes a hexagonal socket screw having a head which is supported in a screw head receptacle in one of the clamping jaws and having a threaded stem which engages in a threaded bore in the other of the clamping jaws,
wherein the socket screw additionally includes a shaft provided between the screw head and the threaded stem,
wherein each clamping jaw has an interior face, the interior faces of the clamping jaws being oriented towards one another and the interior face of one of the clamping jaws having a recess, and
wherein the clamping device additionally includes a holding disc disposed loosely on the shaft and engaged in the recess.

9. A pipe joint according to claim 1, wherein the peripheral extension of the connecting element is additionally provided with a plug-in region inward of the teeth, the plug-in region having a sloping surface at the first side of the peripheral extension and a symmetrically sloping surface at the second side of the peripheral extension, and wherein correspondingly shaped surfaces are disposed in the interior faces of the clamping jaws to provide the clamping device with an insertion opening.

10. A pipe joint for forming a junction of a plurality of pipes, each having an end and having an interior which communicates with the end, said pipe joint comprising:
a connecting element having a peripheral extension;
means for mounting the connecting element on a first one of the plurality of pipes;
a connecting member mounted on a second one of the pipes, the connecting member extending into the interior of the second one of the pipes through the end thereof; and
a clamping device joining the connecting member to the peripheral extension of the connecting element, the clamping device including a pair of oppositely disposed clamping jaws and screw connection means for holding the clamping jaws together,
wherein the connecting element is provided with marking grooves which converge toward one another at an angle of 45°.

11. A pipe joint for forming a junction of a plurality of pipes, each having an end and having an interior which communicates with the end, said pipe joint comprising:
a connecting element having a peripheral extension;
means for mounting the connecting element on a first one of the plurality of pipes;
a connecting member mounted on a second one of the pipes, the connecting member extending into the interior of the second one of the pipe through the end thereof; and
a clamp device joining the connecting member to the peripheral extension of the connecting element, the clamping device including a pair of oppositely disposed clamping jaws and screw connection means for holding the clamping jaws together,
wherein the connecting element includes a member shaped generally as half of a disc,
wherein the first one of the pipes includes a pipe wall substantially encircling the interior of the first one of the pipes, a tube having a channel and an end, and joining means connecting the tube and the pipe wall for mounting the tube inside the pipe wall so that the end of the tube is positioned at the end of the first one of the pipes and so that the channel of the tube is centrally disposed in the interior of the first one of the pipes, the pipe wall having a longitudinal groove, and
wherein the means for mounting the connecting element includes dovetailed feet which are connected to the member shaped generally as half of a disc and which extend through the longitudinal groove in the pipe wall, and headless screws which extend through the feet and the member shaped generally as half a disc to clamp the member shaped generally as half disc to the pipe wall.

12. A pipe joint according to claim 11, wherein the joining means comprises three webs which hold the tube in its position with respect to the pipe wall, the longitudinal groove in the pipe wall being exposed to two of the three webs.

13. A pipe joint according to claim 11, wherein the joining means comprises four webs arranged offset by 90° relative to one another and wherein the pipe is provided with at least one additional longitudinal groove, each longitudinal groove being offset from every other longitudinal groove by at least about 90°.

14. A pipe joint according to claim 11, wherein the first one of the pipes further comprises another pipe between the tube and the pipe wall, wherein the joining means comprises four webs between the tube and the another pipe, and eight webs distributed uniformly between the another pipe and the pipe wall, and wherein the pipe wall has another seven longitudinal grooves, with each of the longitudinal grooves being exposed to a respective pair of the webs between the another pipe and the pipe wall.

15. A pipe joint according to claim 14, wherein the another pipe has an outer surface with a longitudinally extending flute facing each longitudinal groove and centrally positioned relative to the respective longitudinal groove, and wherein the headless screws have tips engaging into one of the flutes.

16. A pipe joint for forming a junction of a plurality of pipes, each having an end and having an interior which communicates with the end, said pipe joint comprising:
a connecting element having a peripheral extension;
means for mounting the connecting element on a first one of the plurality of pipes;
a connecting member mounted on a second one of the pipes, the connecting member extending into the interior of the second one of the pipes through the end thereof; and
a clamping device joining the connecting member to the peripheral extension of the connecting element, the clamping device including a pair of oppositely disposed clamping jaws and screw connection means for holding the clamping jaws together,
wherein the connecting element includes a member shaped generally as half of a disc;
wherein the peripheral extension is semicircular,
wherein the member shaped generally as half a disc has a side with a central recess, and
wherein the pipe joint further comprises a pipe clamp which encloses the first one of the pipes and which passes through this recess, the pipe clamp including pipe clamp halves which contact the first one of the pipes, a pair of further clamping jaws integrally connected to the pipe clamp halves, and further screw connection means for holding the further clamping jaws together, the further clamping jaws having interior faces with continuous grooves, and a further connecting member which is received by the grooves of the further clamping member, the further connecting member additionally being inserted into the end of a third one of the plurality of pipes.

17. A pipe joint according to claim 16, wherein the pipe clamp includes additionally comprises a pair of additional clamping jaws which are disposed opposite the further clamping jaws, and additional screw connection means for holding the additional clamping jaws together, the additional clamping jaws receiving an additional connecting member which also extends into the interior of a fourth one of the plurality of pipes.

18. A pipe joint for forming a junction of a plurality of pipes, each having an end and having an interior which communicates with the end, said pipe joint comprising:
a connecting element having a peripheral extension;
means for mounting the connecting element on a first one of the plurality of pipes;
a connecting member mounted on a second one of the pipes, the connecting member extending into the interior of the second one of the pipes through the end thereof; and
a clamping device joining the connecting member to the peripheral extension of the connecting element, the clamping device including a pair of oppositely disposed clamping jaws and screw connection means for holding the clamping jaws together,
wherein the connecting element includes a member shaped generally as half of a disc,
wherein the peripheral extension is semicircular,
wherein the member shaped generally as half of a disc has a side with a central recess, and
wherein the pipe joint further comprises pipe clamp means for connecting the first one of the pipes to a third one of the plurality of pipes, a fourth one of the plurality of pipes, and a fifth one of the plurality of pipes, the pipe clamp means passing through the central recess and including three mutually 90° offset pairs of further clamping jaws and screw connection means for holding each pair of further clamping jaws together.

19. A pipe joint according to claim 16, wherein the pipe clamp halves have arcuate exterior surfaces, and further comprising a further connecting member extending from the exterior surface of one of the pipe clamp halves, a further clamping device attached to the further connecting member, and another connecting member joining the further clamping device to a fourth one of the plurality of pipes.

20. A pipe joint for forming a junction of a plurality of pipes, each having an end and having an interior which communicates with the end, said pipe joint comprising:
a connecting element having a peripheral extension;
means for mounting the connecting element on a first one of the plurality of pipes;
a connecting member mounted on a second one of the pipes, the connecting member extending into the interior of the second one of the pipes through the end thereof; and
a clamping device joining the connecting member to the peripheral extension of the connecting element, the clamping device including a pair of oppositely disposed clamping jaws and screw connection means for holding the clamping jaws together,
wherein the connecting element includes a member shaped generally as a disc with an enlarged central portion, the peripheral extension surrounding the enlarged central portion and having a circular outer edge,
wherein the enlarged central portion of the connecting element has a radially oriented threaded bore, and
wherein the pipe joint further comprises a further connecting member inserted into the threaded bore, a further clamping device attached to the further connecting member, and an additional connecting member which is attached to the further clamping device and which is inserted into the interior of a further one of the plurality of pipes.

21. A pipe joint according to claim 20, wherein the threaded bore in the enlarged central portion of the connecting element has an outer portion with a frustoconical shape, and wherein the further connecting member includes a threaded stem which is screwed into the threaded bore, and a frustoconical portion which is received in the outer portion of the threaded bore.

22. A pipe joint according to claim 20, wherein the enlarged central portion of the connecting element has at least one further radially oriented threaded bore, and further comprising a blind plug closing a further threaded bore.

23. A pipe joint according to claim 1, wherein the connecting element comprises a member shaped generally as a disc with an enlarge central portion, the peripheral extension surrounding the enlarged central portion and having a circular outer edge.

24. A pipe joint for forming a junction of a plurality of pipes, each having an end and having a longitudinal axis running through the end, said pipe joint comprising:

a connecting element having a back and having an arcuate peripheral extension with concentric teeth;

means for mounting the connecting element on a first one of the plurality of pipes, with the back of the connecting element facing the first one of the pipes;

a connecting member having a first portion which is connected at the end of a second one of the plurality of pipes and having a second portion which extends from the end, the longitudinal axis of the second one of the pipes running through the second portion, the second portion having a plurality of detent tabs;

a first clamping jaw having a side with recesses to receive the teeth of the peripheral extension and recesses to receive the detent tabs;

a second clamping jaw having a side with recesses to receive the teeth of the peripheral extension and recesses to receive the detent tabs; and means for holding the clamping jaws together with the sides having the recesses facing one another.

25. A pipe joint according to claim 1, wherein the connecting element comprises a member shaped generally as half of a disc, and wherein the peripheral extension is semicircular.

* * * * *